United States Patent [19]
Huellinghorst et al.
[11] 4,410,949
[45] Oct. 18, 1983

[54] CONTROLLER FOR FUEL DISPENSER

[75] Inventors: Thomas R. Huellinghorst, Florissant; Benjamin A. Hammond, II, Overland; Robert H. Luedde, Villa Ridge; William C. Mertz, Webster Groves, all of Mo.; Steven H. Goldberg, Santa Clara, Calif.

[73] Assignee: Unidynamics/St. Louis, Inc., St. Louis, Mo.

[21] Appl. No.: 185,612

[22] Filed: Sep. 9, 1980

[51] Int. Cl.[3] .......................... G06F 15/56; B67D 5/08
[52] U.S. Cl. .............................. 364/465; 250/231 SE; 340/347 P; 377/21
[58] Field of Search .................... 364/465; 222/22-36; 340/347 P; 250/231 SE; 377/21

[56] References Cited

U.S. PATENT DOCUMENTS

| | | | |
|---|---|---|---|
| 3,751,642 | 8/1973 | Todd et al. | 364/465 |
| 3,765,567 | 10/1973 | Maiocco et al. | 222/30 |
| 3,813,527 | 5/1974 | Langston | 364/465 |
| 3,935,435 | 1/1976 | Greenwood | 364/465 |
| 3,967,271 | 6/1976 | Day | 340/347 P |
| 4,033,883 | 7/1977 | Zinsmeyer et al. | 250/231 SE |
| 4,051,998 | 10/1977 | Zabel | 364/465 |
| 4,064,555 | 12/1977 | Ottenstein | 364/465 |
| 4,074,356 | 2/1978 | Schiller et al. | 369/465 X |
| 4,094,371 | 6/1978 | Ferrell | 340/347 P |
| 4,122,524 | 10/1978 | McCrory et al. | 364/465 |
| 4,182,953 | 1/1980 | Hurley et al. | 250/231 SE |
| 4,216,529 | 8/1980 | Krystek et al. | 364/465 |
| 4,247,899 | 1/1981 | Schiller et al. | 364/465 |
| 4,290,538 | 1/1981 | White et al. | 377/21 X |

*Primary Examiner*—Felix D. Gruber
*Attorney, Agent, or Firm*—Paul M. Denk

[57] ABSTRACT

In a computer controller for fuel dispensing including a base member, a pulser member supported by the base member and capable of detecting the various increments of fuel quantity being dispensed in addition to deductions therefrom, the signals from the pulser being transmitted to a computer, the computer processing the signals for delivery to a display assembly, and disclosure of the processed information upon liquid crystal displays readily available for view by the customer; a junction box mounted upon the base member, the junction box being completely sealed for exhibiting explosion proof attributes to prevent ignition from sparking of the associated electrical wires or thermal heating of associated electrical components, contained therein and precluding an incident ignition of the external ambient fuel vapors, a computer housing mounted upon the junction box and incorporating the various intrinsically safe circuit boards comprising the computer, and the display assemblies either connecting upon the computer housing or being portable in installation for suspension upon the front of the existing dispenser in converting it from the mechanical actuation type to an electronic computer controlled fuel dispenser.

42 Claims, 40 Drawing Figures

CONTROLLER FOR FUEL DISPENSER

BACKGROUND OF THE INVENTION

This invention relates to fuel delivery, and more specifically pertains to a computer controller for fuel dispenser that may be substituted into existing mechanical dispensers, or embodied within new dispensers, to provide electronic computations of the various information customarily needed and desired regarding the delivery of fuel to a customer.

With the onset of the fuel shortage, as everyone is well experiencing, and with the consequent rapid increase in the cost for such fuel, the usual and standard mechanical fuel pumps employed for many years are rapidly becoming, if they have not already attained, a state of obsolescence. One can readily determine this by visiting his local service station and ordering a "fill-up" only to be confronted with pricing and dispensing information that is usually depicted at one-half of the actual value or quantity of the transaction. Confusion prevails.

As a result of the foregoing, numerous types of electrically controlled fuel pumps are being delivered to the market, principally within new equipment, with some computers being retrofitted within existing mechanical pumps and converting from such mechanism to electronic data processors for furnishing information relative to the fuel being dispensed. An example of the use of the electronic computer in the fuel pump can be observed upon viewing information relative to such types electronic retrofit computers and of pumps currently being marketed by companies such as Precision Controls Instruments, Inc., of Dallas, Tex., a micro processor controlled gas pump being marketed by The Siemens Corporation of Karlsruhe, West Germany, a pump marketed by the Datacon, Inc., of Arlington, Tex., and a pump distributed by the S/W Pump Company of Bonham, Tex.

In addition to the foregoing, some patents have already issued to various companies, some of which have been listed above, upon their various computer controlled fuel pumps, and an example of such is shown in two patents to Tokeim Corporation, in their U.S. Pat. Nos. 4,051,998, and 3,813,527. In the latter patent, the concept of utilizing a pulser for creating electrical signals as an output from a mechanical meter that measures the volume of flow of gas through a dispenser is shown. But, it would not appear that the pulser used in the two identified patents provides for the output of multiple electrical pulses, for the sake of precision, as is done in the pulser means of the current invention as will be subsequently analyzed.

On the other hand, as shown in the U.S. Pat. No. 3,751,642, it can be seen that an encoding wheel is used containing pulse generating strips for providing a determination of the rate of fuel being dispensed, and the overall volume.

The two patents to Schiller, U.S. Pat. Nos. 4,074,356, and Greenwood, 3,935,435, disclose other variations upon computerized type of gasoline dispensers, but in the Greenwood device, it would appear that it is used more in the form of a computerized type of pump that can be used in conjunction with a coin receiving depository that calls for the delivery of gas depending upon that amount of monetary deposit made by the customer. Hence, this said dispenser is more designed for use for self-service pumping of gasoline. And, the Schiller patent provides for a computerized system for dispensing of gas but which is designed for furnishing remote control to the customer principally at a self-service delivery type of service station.

The patent to McCrory, U.S. Pat. No. 4,122,524, also discloses the use of a pulser for providing the conversion from gas flow to the generation of a signal for electronic logic processing, and in addition, the apparatus also furnishes a particular type of light-transmissive liquid crystal display panel for furnishing information relative to sale price of the gas being dispensed. The patent to Ottenstein, U.S. Pat. No. 4,064,555, discloses a gas pump modification apparatus, which is of computerized operation, and which is designed for functioning as a converter for use with a standard or current gasoline pump and which has the mechanical or gear driven price multiplier included within its structure. This device does provide for a convertible face plate for adapting the current mechanical pump for use for displaying computer formulated information relative to the gas being dispensed to a customer.

A variety of older patents having some computer or electrical operations for displaying information relative to dispensed gas are shown in the earlier U.S. Pat. Nos. 2,428,382; 3,313,453; 3,318,479; 3,641,536; and 3,765,567. While these particular older patents do not appear to be very pertinent to the current invention, they do show some of the earlier developments in this art relating to the conversion of gas pumps from the mechanical accounting or accumulator functions to ones that are computer controlled.

In view of the foregoing, it is the principal object of this invention to provide a computer controller for fuel dispenser wherein it incorporates pulser means that provides multi-level detection of the rates of flow in the delivery of gasoline to a customer, in order to enhance the precision and accuracy of the fuel being dispensed.

Another pertinent object of this invention is to provide a pulser means that also may detect, for the sake of high accuracy, not only when fuel is being dispensed, but when hydraulic shock may momentarily cause a flow reversal of fuel through the meter, so that a deduction can be made from the quantity of fuel being dispensed in order that the customer is not charged during such occurrence.

Federal authorities have been conducting tests of various gasoline pumps throughout the Country, through its Division of Weights and Measures, in the Agriculture Department, for the purpose of determining just how accurate are existing gasoline pumps, and whether the customer is being charged fairly and accurately, or perhaps being inadvertently, or even advertently, overcharged. Such surveys have indicated that at least one out of every twenty gasoline pumps checked were inaccurate and in most instances the customer is being overcharged, but in certain other instances, the surveys found that the customers were even being given more gas than the meters indicated or charged for. Hence, the need for greater accuracy is essential, not only to maintain the public trust, but likewise to prevent the station operator from becoming too charitable.

Still another object of this invention is to provide computer means for processing signals received from a highly accurate pulser means, and for providing a read-out of information relative to the total volume of sale, in addition to the total value of sale, upon specially designed liquid crystal displays located upon assemblies that are readily observable by the customer.

Still another object of this invention is to provide liquid crystal display assemblies incorporating heater means that assure their precise operation regardless of just how low temperature conditions may prevail in a geographical area.

Still another object of this invention is to provide means for assuring the safety of the station attendant, or the customer self-serving himself, from a computer controlled fuel dispenser through the usage of junction box means that shields against any ignition of the prevailing and ambient fuel vapors which normally pervade around such dispensers.

Yet another object of this invention is to provide means for providing rapid conversion of a computer from one that operates in the English system of units to the metric system of units.

Another object of this invention is to provide a computer controller for use in fuel dispensing and wherein its computer means is intrinsically safe due to its design operation to use voltages that are of such low level that sparking is precluded.

Still another object of this invention is to provide a computer controller for fuel dispenser wherein its displayed data incorporates back lighting for its liquid crystal display assemblies in order to facilitate the viewing of such information, particularly at night.

Still another object of this invention is to provide a computer for a fuel dispenser and which is substantially tamper proof in that it contains operating mode exclusivity, whereby no price changes can be made during a sale, and no sales can be made during that time when the operator is determining the dispenser totals.

Still another object of this invention is to provide a computer for a fuel dispenser in which it price range and totals can be read out in both the English and metric systems of measurement.

A further object of this invention is to provide a dispenser incorporating a computer means and which may provide a readout of data for viewing on either one or both of its side displays.

Still another object of this invention is to provide a fuel dispenser which is self diagnostic for monitoring its failures, in addition to providing a visual, and perhaps audible, indication that a malfunction has occurred.

Still another object of this invention is to provide a fuel dispenser wherein its data displays may be integrally affixed therein, or be portably mounted upon existing dispensers.

A further object of this invention is to provide a computer controller for fuel dispenser wherein it is accurate for dispensing fuel up to approximately fifty (50) gallons per minute.

Still another object of this invention is to provide a display for a fuel dispenser wherein up to a total of nine hundred (900) gallons or nine hundred (900) liters may be dispensed and recorded during a sale.

Still another object of this invention is to provide a safety means inherently within the dispenser wherein it may be set to gauge up to ninety nine (99) gallons of fuel dispensed, and then shut off thereafter, so as to prevent fuel theft during the dispenser's down hours.

Yet another object of this invention is to provide a display assembly for the computer for a fuel dispenser and which may display five and even six digits of information.

Still another object of this invention is to provide a computer controller for fuel dispenser wherein external indicators are provided for determining the dispenser status.

Yet another object of this invention is to provide a computer for displaying data relative to fuel dispensing and which incorporates the floating decimal type of displays for enhancing the range of fuel dispensed and price and quantity information disclosed.

Yet another object of this invention is to provide a display of sales information that may be totalized to eight digits.

Another object of this invention is to provide a sensor means for the fuel dispenser and which can gauge one-/one hundredths (1/100) or one/one thousandths (1/1000) per gallon or liter of increments of fuel being dispensed.

Yet another object of this invention is to provide the combination of a computer controller for displaying data relative to fuel dispensing, and which functions in cooperation with the standard mechanical volume totalizer yet currently available upon existing dispensers.

Another object of this invention is to provide an electronic computer which may be easily retrofitted within the existing standard mechanical dispenser, and which also incorporates portable displays that may be suspended upon the existing front panel of said standard dispenser during the conversion process.

Still another object of this invention is to provide a computer controller for fuel dispenser wherein remote price setting can be easily accomplished through the use of a keyboard inputting means.

Yet another object of this invention is to provide a computer controller for fuel dispenser wherein remote sensing may be utilized for obtaining data relating to sales and computer status that may have been accumulated during some period of time, as at the end of a day's operation.

Still another object of this invention is to provide price security by allowing normal operation of the locked dispenser by the station attendant.

Another object of the invention is to provide a computer controller for fuel dispenser that allows a total individual sale display up to an amount at least to $900.00, as for example, can occur and be useful at truck stop stations.

Still another object of this invention is to provide a computer wherein preset capabilities of remote readouts can be easily accommodated by an adapter device.

Yet another object of this invention is to provide a computer controller for fuel dispenser wherein line voltage may be used for routine operations of same, but yet which computer incorporates a back-up battery that allows a readout of data for some predetermined amount of time even after the line voltage has been shut-off or when it has been disabled due to some mechanical or electrical malfunction, or due to a power shut-off as a result of weather conditions.

Still another pertinent object of this invention is the provision of a computer means for a fuel dispenser that can be quickly and easily exchanged in an existing fuel pump.

These and other objects will become more apparent to those skilled in the art upon reviewing the summary of this invention, and upon undertaking a study of the description of its preferred embodiment in view of the drawings.

SUMMARY OF THE INVENTION

This invention contemplates the formation of the solid state computer assembly embodied within mechanical means useful for determining the rates of flow of gasoline or other fuel being dispensed from a dispenser, the volume of flow occurring, and the value of the fuel being dispensed during such a transaction. The computer is programmed for the reception of information relative to the price per unit volume of fuel to be dispensed, so that it may be adjusted in accordance with price variations that are frequently occurring with regard to marketing of current day petroleum products. On the long term, the computer of this invention is also constructed and programmed for providing either direct or remote readout of more long term transactions, such as the total volume of gasoline that may have been dispensed during a service day, or for a longer or shorter period of time, the total dollar value of sales made, in addition to the number of transactions performed along with price security data and allocation limits. And, this information can be recalled through the use of keyboard means, as by sequential actuation of one of the keys, to obtain the most long term information, and which keyboard can be actuated for the inputting of particularly the price per unit volume when price changes do occur. In addition, means are operatively associated with the keyboard for providing remote access to this long term data, so that the operator need not open up the dispenser each day to determine his totals, but rather, through the simple use of a magnetically actuated means in association with a wand-like member, such information can be obtained remotely from the dispenser.

The structure of this invention includes a pulser means that interconnects with the currently used flow meters that are associated with such dispensers, with the pulser means incorporating an encoder disc that is multi slotted for providing means for detecting light signals emitting from light emitting diodes, or other light producing sources, and their reception within photo sensitive transistors that are triggered each time a light pulse is received, and as a result, generate electrical signals coincident with the pulses derived from the encoder means during its revolving within the pulser housing. The pulser housing mounts upon a base member of this invention, and associates with a junction box in which the variety of electrical cables and other wiring which normally carries that higher charge for initiating the electrical operations of this dispenser, and which charge can generate spark that can normally result in the ignition of fuel vapors and therefore, this junction box is designed explosion proof, including those access points where electrical wires extend into or out of the same, so that all of the higher charge carrying cables may be located within the junction box, transformed to lower voltage levels therein, before they extend back out of said junction box and deliver their transformed voltage to the computer means, the lights, the heaters, or other switches operatively associated with this pump. Thus, those wires carrying the lower line voltage ordinarily cannot create that type of a spark which can lead towards fuel ignition, due to the low voltages and amperages being conducted by the same.

Mounted on the junction box or the base member of this invention is the computer housing, or card cage as it is called, wherein the various circuit boards operatively associated with the computer means of this invention are located, and further mounted on opposite ends or sides of this computer housing are the various display assemblies, which incorporate display means constructed in accordance with liquid crystal display technology, so that upon the processing of the information by the programmed computer, signals coincident with the pumping of fuel can be continuously processed and transmitted to these display assemblies for continuous monitoring by the customer during a purchase of fuel.

The pulser means of this invention, as briefly previously analyzed, includes means for detecting the rotation of the pump flow meter output shaft, as such systems are currently used, and this pulser means incorporates an encoder disc that is multi-channeled through the use of a variety of rows of slots, preferably three rows in number, so that the various states of the pulser output at the most recent detection are compared with the output states from previous detections, so that this information can then be acted upon by the computer means for a determination of the amount of pulser rotation, the direction of the pulser rotation, the rate of pulser rotation, and to make a diagnostic test on the pulser's functional status. In the event of a pulser failure, an error code is generated within the computer which shuts down the dispenser until the error code is acknowledged. This pulser, as previously explained, has three outputs that transition between the binary logic "1" and logic "0" as the pulser is rotated. These are referred to as the A-channel, B-channel, and C-channel of the encoder disc of this invention. Their individual functions will be described.

From a physical standpoint, the pulser assembly of this invention, as previously summarized, includes the various channels in the form of slots provided in three rows through this encoder disc. The A-channel consists of one hundred twenty-five slots positioned on a 0.8 inch radius from the center of the disc. This channel provides for one thousand pulses per gallon of product flow through the fluid meter. This allows the microcomputer to recognize a minimum increment of 0.001 of a gallon of fuel being dispensed. The one thousand pulses are achieved by generating a pulse for each edge of a slot, thereby producting 250 pulses for each revolution of the disc, with there being exactly four revolutions of the disc for each gallon of product passing through the fluid meter of the mechanical pump.

The B-channel of the pulser means, or more specifically its encoder disc, also consists of one hundred twenty-five holes positioned on a 0.7 inch radius from the disc center. The holes in this channel are offset relative to the A-channel, and this offset provides data to the microcomputer for its determination as to the direction of rotation of the encoder disc. With knowledge of fluid flow direction, one can more accurately track exactly what amount of product is actually delivered, even though there may be transient fluid reversals in flow direction due to pressure variations within the pump, its hose, or from other causes. The C-channel consists of fifty holes positioned on a 0.6 inch radius of the center of the disc. This channel is used to measure flow in increments of 0.01 of a gallon. It allows the invention to more accurately measure flow even when the rate rises up to fifty gallons per minute. And, as previously explained, all of these components for the pulser assembly of this invention are mounted upon a base casting, or a base member, and are reasonably sealed to protect the same from dirt or contamination through the use of a metal cover.

The primary function of the A-channel of rows or slots through the encoder disc is one of counting, so that each logic level transition of this channel is considered to be a count which represents a finite measurement of the pulser rotation. The primary function of the B-channel in combination with the A-channel is to determine the direction of rotation of the pulser's encoder disc. The output of this channel is identical to that of the A-channel except that it is offset from the A-channel to create the repeating pattern of various zones of relationship between its slots and those set forth in the A-channel. By comparing the various pulser zones within each channel or rows of slots within the encoder disc, the previous sample pulser zone can be gauged for determining if the pulser has rotated, and if so, in which direction it has rotated. It can readily be determined that in order to maintain accuracy, the sampling rate must be high enough relative to the pulse or rotation rate so that at least one sample occurs in each detecting zone of the various rows of slots. The C-channel or row of slots, has two main functions. First it is used to determine the rate of rotation, and secondly it is used to measure fuel delivery at rates above those measured by the A-channel. There are fewer C-channel pulses per revolution, only 40% as many as the A-channel. A final divide by two is performed by a toggle type flip-flip that is sensitive to one edge of the pulses being generated by the light passing through a slot to its phototransistor, and this means that the changes in the logic state of the output of the toggle type flip-flop occur on a given edge of each C-channel pulse. This divide-by-two flip-flop combined with the 40% slot ratio gives a five to one A-channel to C-channel ratio. By referencing the same edge of each pulse, variables such as pulse duty cycle, sensitivity of the sensor, and the changes in sensitivity of the sensor with temperature are eliminated. Variations are therefore reduced to variations in pulse edge to pulse edge distance and sensor repeatability.

The method used to determine the rate of rotation is to count the number of times the pulser outputs are sampled between each change in the logic state of the output of the toggle flip-flop. This number is then tested against a constant to determine whether the system should be counting using the A-channel, or if it should count changes in the output of the toggle flip-flop. After the count of samples is tested, they are discarded and a new count is started for the next period. In order to avoid errors in the measurements of pulser rotation, two constraints are placed upon the system, first, a change in measurement counting source, such as A to C or C to A, must occur at the change of logic state at the output of the toggle flip-flop, and secondly, there must always be the same number of A-channel transitions between each change of the logic state of the output of the toggle flip-flop when the pulser is moving consistently in a given direction. All high rates of speed are assumed by the system to be in the positive flow direction, i.e., all rates of speed that are measured by the C-channel rows of slots. Further, when the A-channel is the measurement source, and the pulser is rotating so fast that a zone is not sampled, the assumption is made that product flow is in the positive direction. The pulser interface consists of the toggle flip-flop, mentioned above, and a multi-channel latch which is driven from the system clock to latch the state of pulser channels A and B and the output of the C channel toggle flip-flop each time a sample is taken. The output of the latch then holds this data until the next sample. The same signal which is used to latch the data is also used to call for an interrupt to the processor to test the pulser output stored in the latch.

The processor, in addition to running the count algorithm, also runs a test on the functional status of the pulser. This test monitors a circuit which checks the pulser diodes for failure and also checks for activity on all three pulser channels. If there is a change in pulser diode current or if activity should cease on one or two of the pulser channels and yet continue on the remaining channel(s), then an error signal will be generated to stop product flow and indicate the nature of the problem.

The overview of the flow of data from the pulser input shaft through the display and the remote communications output is through the use of the computer means of this invention, as preprogrammed, with the display of data onto the liquid displays of the display assemblies of this invention. It should also be stated that the internal count buffer and sale memory of the computer means of this invention are cleared to 0 at the beginning of each sale during a fuel dispensing function.

The solid state computer and display of this invention includes a microcomputer that is housed within the mechanical package, which mechanical package effectively matches the existing mounting points of typical pump and dispenser units which are used throughout the retail gasoline market. This invention provides new features not presently available in mechanical computers in addition to improved reliability and decreased maintenance requirements.

The electrical assembly, and more specifically the computer and wiring assemblies, of this invention consist primarily of printed circuit card assemblies interconnected by cable assemblies. The printed circuit assemblies consist of the power supply/control, and there are three circuit cards mounted within the junction box of this invention, and which contain the J-Box mother board, the control board, and the barrier board. In addition, the electrical assembly includes the microcomputer, and the contents of this computer are mounted upon four circuit cards that are located within the computer housing or card cage of this invention, as previously explained. These include the central processing unit I including the computer memory, the central processing unit II, comprising the input/output and control for the computer, the money/gallon display drive, and the price display drive. In addition, the electrical assembly obviously includes means for processing the pulses obtained from the pulser assembly by means of its light triggering its photo sensitive transistor, and there is one circuit card in the pulser for accommodating the generated electrical charges.

The power supply and control circuits of this invention provide the system interface to line power, i.e., the 120/240 VAC, 50 or 60 Hz single phase, and to the pump power circuits and fluid flow control valves when applicable. The typical pump power circuits are 120/240 VAC, 50 or 60 Hz, single phase as also are the flow control valve circuits. The power supplies convert line power to low level power. This low level power is isolated and assured intrinsically safe by various barrier circuits, as previously explained, within the explosion proof junction box of this invention. When a computer has determined that an output should be produced to cause a valve to operate or the product pump to operate, this low level signal is sent back through the barrier circuits to the control circuit card where it is amplified and converted to 120 or 240 VAC, depending on whether such charge is to operate a valve or provide pump power.

All of the signals which connect between the computer and circuits inside the junction box are routed through the barrier circuits. The barrier circuits insure that all of the wires which are outside of the junction box are intrinsically safe, i.e., these wires can be shorted to each other or to ground or be open circuited and the energy available is limited to a level below that which is necessary to produce an explosion in a Class 1, Group D hazardous atmosphere. The transformers utilized to isolate the computer power circuits from the power line circuits are of special design to accommodate this feature for the invention.

The micro-processor of this invention is a standard complementary metal oxide silicon device designated by RCA Corporation, of Somerville, N.J. In the preferred embodiment, it has an eight bit data bus, and a multiplexed eight bit address bus which provides for addressing to 65,000 locations. The micro-processor, program memory and data memory which form the microcomputer are all located on the circuit boards within the computer housing of this invention. The keyboard means for inputting data to the computer is connected directly to the central processing unit I. The central processing unit II circuit card contains the various control circuits which handle battery control and switching during power loss and provide for power up sequencing at power on. The central processing unit II card also contains circuitry which monitors the ambient temperature and, at 32° F., ±2° F., this circuit causes heaters to be energized to maintain the liquid crystal display at a +32° F. minimum.

In addition to the foregoing, the pulser signals are connected to the central processing unit II for conditioning before they are connected to the computer data bus.

The money/gallon display drive circuits generate the signals needed to produce intelligence on the liquid crystal displays of the display assemblies.

The price display circuits perform the decoding to separate the money/gallon data, the price data, the pump status data from the signals on the computer data bus. In addition, the circuits generate the signals which produce intelligence on the price liquid crystal displays.

These liquid crystal displays are mounted upon the display assembly, and each contain their own individual printed circuit cards. The assembly incorporates a heater which maintains the liquid crystal display at +32° F. minimum, even down to a temperature of −50° F. ambient. The displays are mounted for either snap on panels or to fixed panels, and they are connected to the display driver circuit cards by way of forty conductor ribbon cables. Through this design the displays are individually replacable, which thereby simplifies their maintenance.

BRIEF DESCRIPTION OF THE DRAWINGS

In the drawings, FIG. 1 discloses an isometric view of a fuel pump, of the type utilized at service stations, embodying the principles of this invention.

DESCRIPTION OF THE PREFERRED EMBODIMENT

Figure 1:
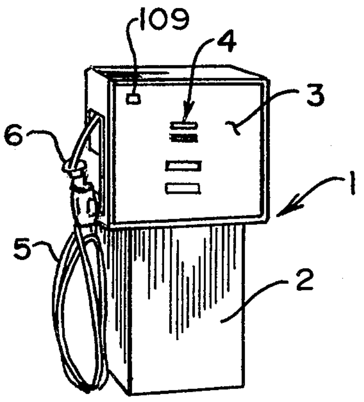

In referring to the drawings, and in particular FIG. 1, there is disclosed the gasoline or fuel pump dispenser 1 of this invention, being of the type as is cutomarily known in the trade, and having a base 2 which displays its face panel 3 approximately at a more convenient heighth for ease of viewing, and having the usual display data, as at 4, as is customarily and routinely demanded by the customer filling from such pumps, and where various pricing and quantity information is conveniently shown at all times while fuel is being dispensed, and for some segment of time thereafter. In addition, the usual fuel hose 5 and its nozzle 6 are connected with such a dispenser, as is well known in the trade.

Figure 2:
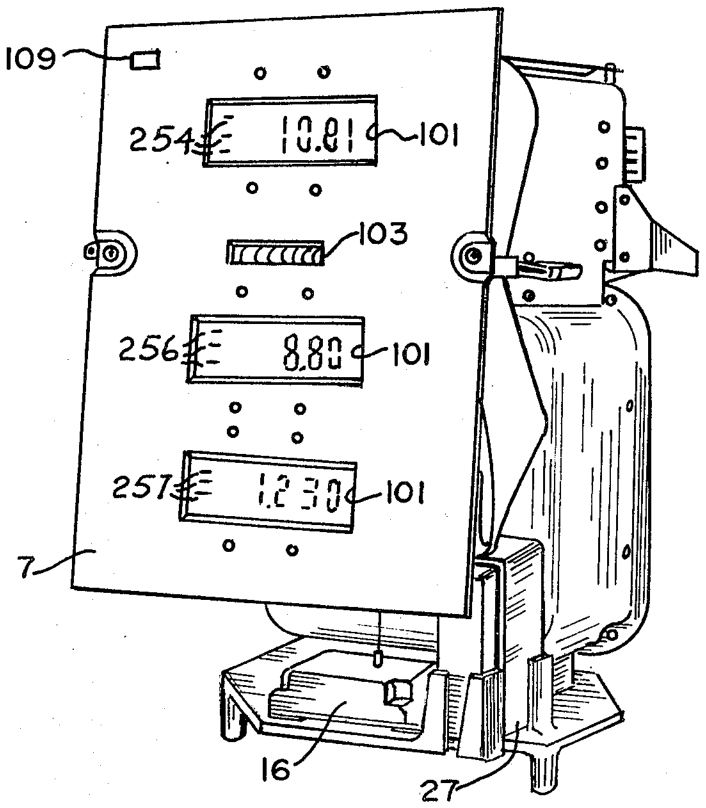
FIG. 2 provides an isometric view of the computer controller for fuel dispenser of this invention, of the type that is installed within the dispenser housing displayed in FIG. 1.
Figure 4:
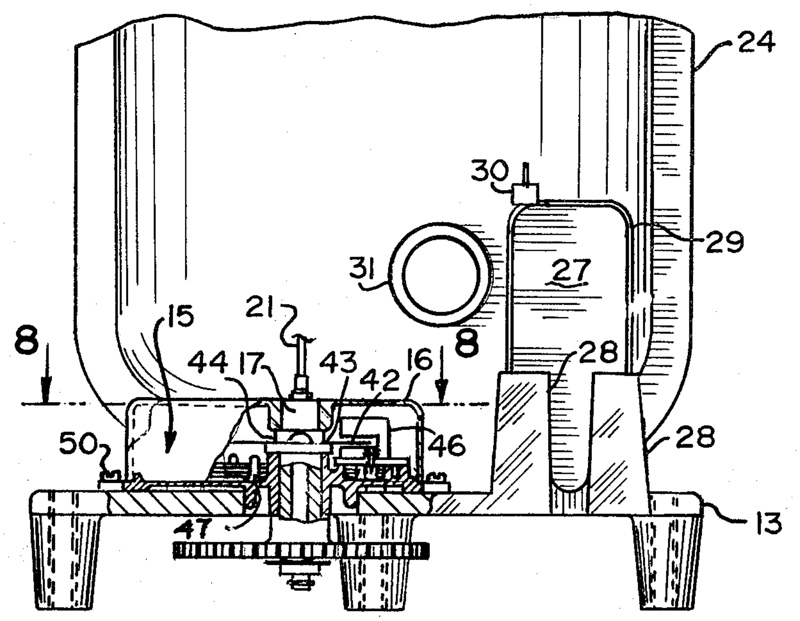
FIG. 4 furnishes a partial rear and sectional view of the lower section of the computer of FIG. 3, principally displaying the pulser arrangement of the invention.
Figure 3:
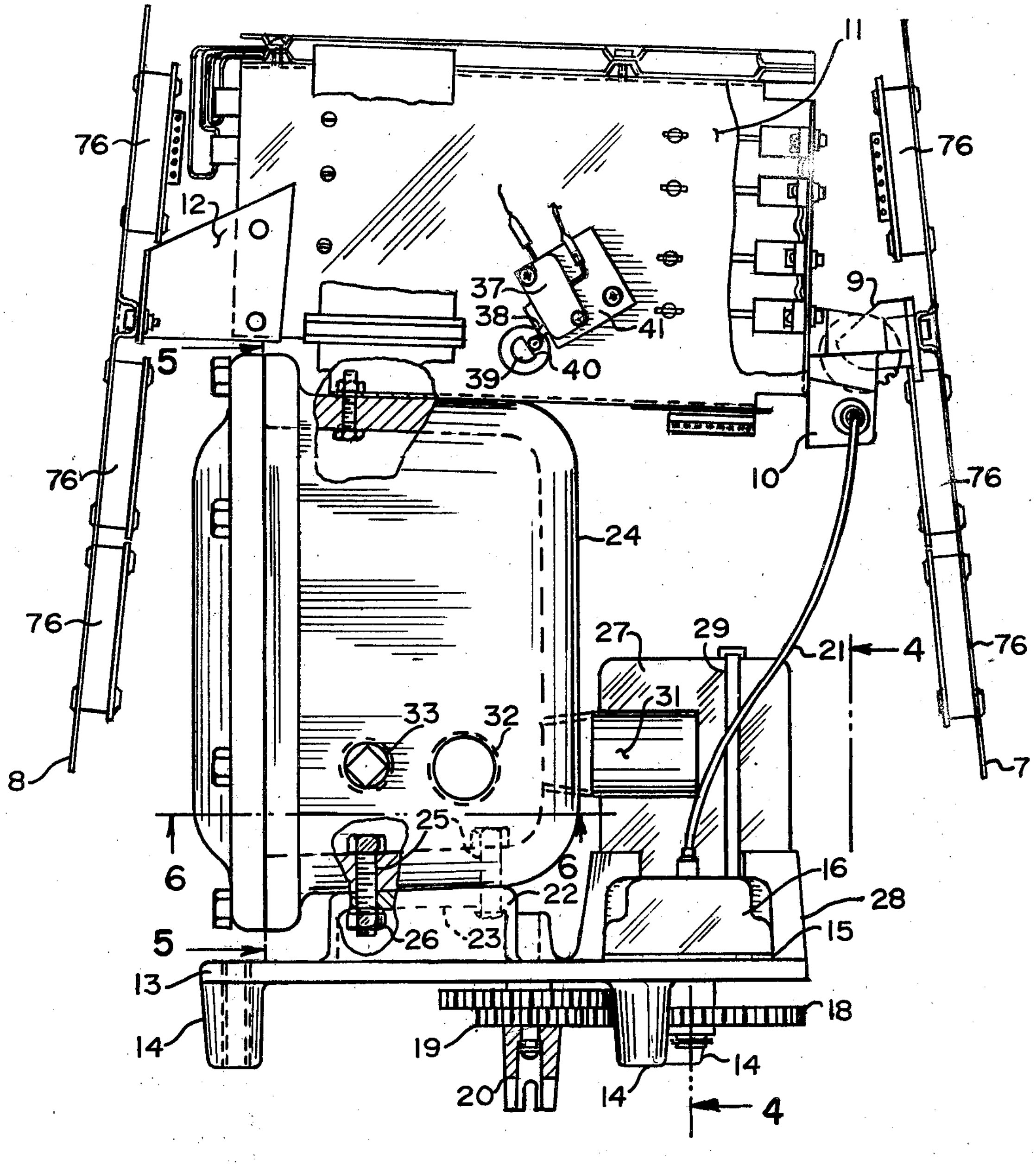
FIG. 3 provides a side view of the computer controlled fuel dispenser shown in FIG. 2.

In referring to FIGS. 2 and 3, there is displayed the essence of this computer controlled fuel dispenser, or more specifically the computerized controller for fuel pump, and which comprises, in this embodiment, a pair of display panel assemblies 7 and 8, with the display panel assembly 7 being mounted to the mechanical totalizer 9 which in turn is connected with the totalizer support bracket 10 and which is mounted by means of rivots, screws, or the like, to the approximate side of the computer housing or card cage 11. In addition, the display assembly 8 connects by means of brackets 12 with the other side of the said circuit card cage 11. Thus, as can be seen, the two display assemblies 7 and 8 are provided in positions that furnish the ready display of their assemblies, to be hereinafter described, for ease of viewing through the aligned face panels 3 of the aforesaid fuel dispenser 1.

The computer controller for this fuel pump, is mounted upon a base assembly 13, which has a series of downwardly depending bosses 14 integrally associated therewith, and through which fasteners may locate for securing the assembly into the pump dispenser 1, as previously described. Mounted upon the upper surface of the said base 13 is the pulser assembly 15, which is capable of removal therefrom, and comprises an integral unit, and securing over the said pulser is a removable cover 16, which functions to shelter the operative components of the pulser arranged therein from being exposed to dust or other deleterious particles that may harm its precision operations. The pulser includes a shaft 17 that extends through it, with the lower end of said shaft extending downwardly beneath the base 13, and which has attached to it a first gear 18, which gear intermeshes with a gear coupling 19, and which coupling 19, at its lower depending portion 20 includes a series of slots for accommodating its interconnection with the standard meter normally associated with a fuel pump of routine design.

Extending upwardly from the shaft 17 of the pulser is a flexible shaft coupling assembly 21, and which flexible shaft extends downwardly through the aforesaid pulser shaft 17, so that when the pulser shaft 17 is turned, by way of its gear 18, the flexible shaft 21 likewise rotates, imparting mechanical motion to the mechanical totalizer 9 for displaying the total amount of fuel being dispensed, quantitatively-wise, in order that the customer will be provided with dual information as to the precise amount of fuel being dispensed from the pump. For example, the station owner may desire to have a mechanical total of the amount of fuel he has dispensed for the day, in addition to a readout from the computer of this invention as to the quantity of fuel that has been dispensed for a day, or some period of time. Hence, this provides reassurance to the station owner as to the exact quantity of fuel being dispensed from his pump. The operations of this mechanical totalizer are identical to those currently in existence, and used with the standard mechanical computer normally associated with fuel pumps currently utilized.

As can also be seen from FIGS. 2 and 3, the base member 13 has an integrally formed upstanding boss 22, being somewhat hollowed out within its interior as at 23, and disposed for mounting upon said boss 22 is the junction box assembly 24 of this invention. As can be seen, convenient fasteners 25 are disposed for having nuts 26 secured thereon so as to rigidly support the said junction box assembly onto the base 13. And, as previously described, the computer housing assembly 11 is mounted onto the upper surface of the said junction box assembly 24.

A few other incidental items operatively associated with the formation of this overall computer controller for a fuel pump includes a battery 27, which is conveniently positioned for stable mounting within integral brackets 28 formed extending upwardly from the base 13, and a tie means 29 is provided through the base 13, and extends upwardly around the said battery 27, and is fastened, as at 30, for securely holding the battery in position. The objects and purposes for this particular battery will be subsequently described.

In addition to the foregoing, a pipe barrier assembly 31 is tightly fastened through a side of the junction box assembly 24, and it is through this pipe barrier that the voltage and current conducting wires, in addition to other electrical wiring, located for delivery of electrical voltage to the operative components located within said junction box assembly 24. It may be commented that this junction box assembly 24 is designed to be explosion proof, and since there may be some high voltage conducted into it, sometimes within the category or range of 110 to 220 volts, the likelihood of any explosion is significantly reduced since the high charge conducting cables terminate within this type of junction box. The fact that gasoline or other vapors readily prevail ambiently around a fuel pump dispenser is well known to anyone receiving gas at a service station, and therefore, there is a need to enhance the safety feature of any computer controlled pump, of the type herein described, in order to alleviate any change or semblance of explosion, fire, or other detrimental occurrence. Actually, the high voltage power is delivered to the junction box assembly 24 through the aperture 32, while additional power may be distributed from the junction box assembly and through cables and wires emanating from the aperture 33 to any lights, or the like, that may be associated with the dispenser. The converted power delivered by the circuit lines through the aperture 32 may then be delivered out of the junction box assembly 24 through the pipe barrier 31 to other electrically operative components of this computer controller. For example, low voltage high current charge may be conducted to the circuit cards contained within the housing 11, in order to provide the proper functioning for this electronic computer.

Figure 6:
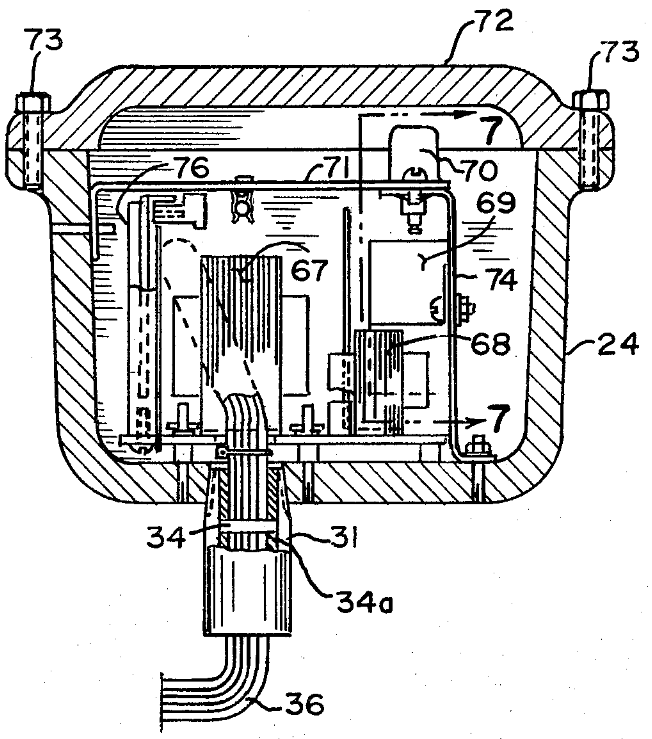
FIG. 6 provides a transverse sectional view of the said junction box of FIG. 5, taken along the lines 6—6 of FIG. 3.
Figure 14:
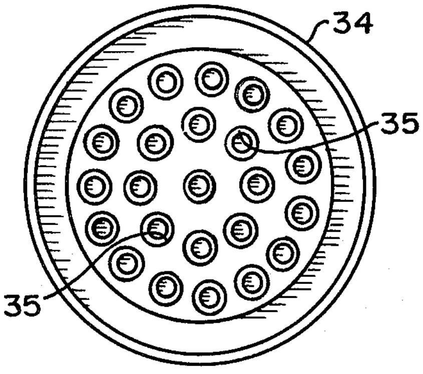
FIG. 14 provides a plan view of the cable packing means provided within the pipe barrier connecting to the junction box.
Figure 15:
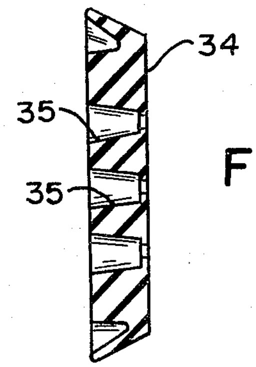
FIG. 15 provides a diametrical sectional view taken through the said packing shown in FIG. 14.

An example of how this pipe barrier 31, through which certain wiring locates, may be made having explosion proof attributes, can also be seen by referring to FIGS. 14 and 15, wherein the packing assembly 34 is shown, with the various electrical wires delivering converted charge from the junction box assembly being positioned through the various apertures 35 provided through said packing. Thus, as can also be seen in FIG. 6, this packing 34, having the various electrical wires 36 located therethrough, is forcefully arranged within the said pipe barrier 31, to provide a seal therethrough, and in addition, various form of epoxy **34*a* is located within said pipe barrier, around the various wiring, and to either side of the packing, in order to assure the proper seal of said wires within the pipe barrier 31, and to prevent the migration of gasoline fumes or vapor into the junction box assembly, at this location. Furthermore, cables 36 are specially coated with a fuel resistant coating or cover in order to prevent their deterioration due to exposure to gasoline, fuel, or their vapors. In addition, as also can be seen in FIG. 6, the pipe barrier 31 is threadedly engaged by means of a pressure fit within the junction box assembly 24, so that in the event that any explosion shall internally occur within said junction box, the pressure of said explosion will not be of sufficient magnitude to cause said pipe barrier 31** to be displaced from its connection with the junction box, and consequently, thereby prevent any larger explosion from occurring around the entire gasoline dispenser, since the internal explosion within the said junction box, should one uneventfully occur, will be confined and retained entirely therein.

As can also be seen from FIG. 3, mounted upon the side of the card housing 11 is a micro switch 37, which has its actuator 38 disposed for biasing against a shaft 39 that extends a short distance for coupling with means operatively associated with the dispenser housing, such as a handle, or other hand gripping means, and which when actuated effects a pivot to the said shaft 39 for initiating actuation of the member 38, and a tripping of the switch 37. This manipulation is made at the beginning of each sale, so as to clear the electronic displays associated with the computer controller, and to provide for the beginning for initiation of the next transaction or sale of fuel. It can be seen that the shaft 39 has a flattened surface, as at 40, and which when turned acts as a cam means for depressing the actuator 38 into its switch 37, for initiating an electrical connection for attaining this function. The switch 37 is mounted by means of a series of fasteners onto a switch plate 41, and which switch plate is capable of adjustment in order to conveniently dispose the switch for proper operation and reception of the hand gripping means, as previously explained, as when this computer controller is located within the dispenser, as aforesaid.

In referring also to FIGS. 2, 3, 4, and 8, the pulser assembly 15 of this invention is shown. This assembly is located beneath the cover 16, as previously described, and the pulser assembly includes the means for converting mechanical rotary motion to electrical signals that will function within the computer for providing the essential data neccesary for recording its operations. More specifically, this particular pulser is useful for converting mechanical movement into a pulsed signal that represents some fraction of a gallon of fuel being dispensed. A more detailed analysis of this pulsing function and its utility for providing precise and accurate analysis of the amount of fuel being dispensed has already been and will be subsequently analyzed. Essentially, the pulser includes the shaft 17, as previously explained, extending through it, and having an encoder disc 42 mounted thereon. The shaft 17 includes an integral shoulder 43 furnished for spacing and locating the disc 42 at its proper location, with another integral shoulder 44 having said disc properly positioned upon said shaft. To hold the disk 42 in position, any form of fastener, such as solder, or the like, may be useful for holding the same in position with the various defined integral shoulders of said shaft 17. As can be seen, the disc extends outwardly at its periphery a sufficient distance for disposition within the formed slot or gap 45 of the sensor housing 46. In addition, bosses 47 may be provided upon the base 48 of the pulser assembly for mounting various circuit boards, such as at 49, as may be required. And, as previously explained, the cover 16 and pulser base 48 may be secured, by way of cooperating fasteners and tabs 50, upon the base 13 of the assembly.

Figure 8:
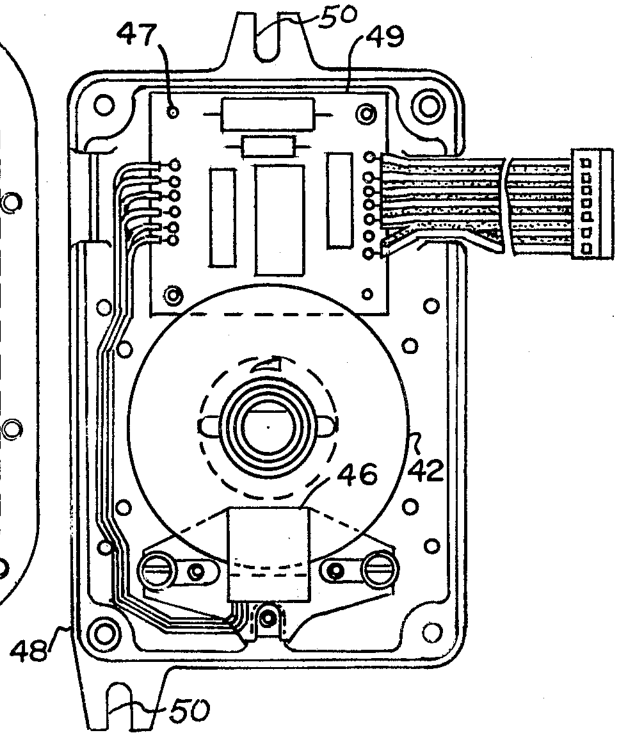
FIG. 8 provides a sectional plan view of the pulser arrangement, taken along the line 8—8 of FIG. 4.

As can further be seen, as in FIG. 8, the relationship between the encoder disc 42, and how its circumferential periphery passes through a gap provided within or through the sensor housing 46, is readily disclosed, in this plan view. In addition, the locating of any circuit board, as at 49, is also shown. And furthermore, the arrangement of all of these components upon the pulser base 48 can be readily observed.

Figure 9:
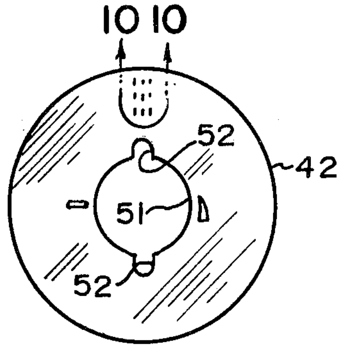
FIG. 9 provides a plan view of the encoder disc of the aforesaid pulser assembly.
Figure 10:
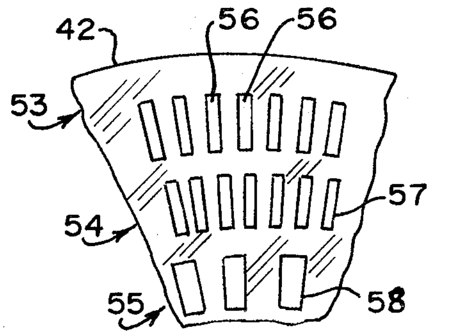
FIG. 10 provides a partial amplified view of the encoder disc taken along the line 10—10 of FIG. 9, and showing the arrangement of the radially located slots.

In referring to FIGS. 9 and 10, the encoder disc 42 is readily disclosed. And, its mounting upon the shaft 17 can be accommodated through its formed aperture 51. The integral slots 52 communicating with the aperture 51 are provided for the proper positioning and holding the encoder disc 42 in place upon its mounting shaft 17, as previously analyzed. Arranged entirely around the circumference of the encoder disc 42 are a series of precisionly located slots, in the preferred embodiment, being arranged in three rows, as previously explained, and as can be seen in FIG. 10, at the identified rows 53, 54, and 55. In the preferred embodiment, the circumferentially arranged rows 53 and 54 each contain the approximately one hundred twenty-five slots being shown with these at 56 and 57 within their respective rows, as can be seen. The row identified at 55 contains fifty such slots, as can be seen at 58, and are useful for providing that indication of the larger increments in volume of fuel being dispensed by the pump.

The outer row of slots 53 is useful for gauging the lower volume rates of fuel being dispensed, and, to add further precision to the operations of this pump, slots 53 and 54 are used to detect that directional reversal in the flow of fuel from the pump, so that as the operator may manipulate the fuel nozzle and hose, there may be a backflowing of fuel therein which reverse directional flow of fuel is detected, and deducted from the overall volume of fuel being dispensed. Hence, precision gauging of the fuel being dispensed is provided through this arrangement. In the preferred embodiment, and to provide a more detailed description of the operations of this pulser, a single turn of the shaft 17 by means of the meter coupling 20, is indicative of the pumping of approximately one quarter gallon of fuel from the dispenser. Thus, four revolutions of the shaft 17, and more specifically its mounted encoder disc 42 is comparable, rather precisely, to the dispensing of one gallon of fuel from this pump. Obviously, while a fairly precise description of this particular embodiment is made herein, it should be readily recognized that by interchanging of the various gears or other components associated with this pulser, that other ratios of dispensing can be readily detected and gauged, so that this computer controller can be used for gauging precision in the dispensing of other quantities of fuel, and perhaps even more accurately, such as by providing for alternate sizes of meters that gauge the rate of fuel flow in differing increments, such that the rate of rotation of the meter coupling 20 may represent the dispensing of one gallon of fuel. Thus, by interchanging of the various gearing 18 and 19, differing ratios of fuel being dispensed can be detected and accommodated by this pulser assembly 15.

As previously explained, the slot rows 53 and 54 are generally used as indicative of the rate of flow of fuel from the dispenser in functioning at all times during fuel dispensing, but in addition, provides means for detecting the direction of flow of the fuel, and that is, whether it is being dispensed, or perhaps some fuel may be drawn back therein and into the pump nozzle and hose. The row of slots 55 generally are used as a means for detecting the rate of flow or quantity of fuel being dispensed particularly at higher rates of flow, normally somewhere above the dispensing of four gallons per minute. Obviously, these rates of flow may be set at other limits or quantities than those described herein, but we are herein describing just that which has been set forth in the preferred embodiment of this invention.

To attain the foregoing, and as previously explained, there are approximately one hundred twenty-five slots arranged circumferentially within the rows 53 and 54. The outer row of slots 53 are arranged such that they overlap with the slots arranged in row 54. Movement of the disc in one of these increments represents one five hundredths of a gallon of fuel having been dispensed or drawn back into the pump, in the event of a reverse movement of said disc. This normally would occur as a result of hydraulic or fuel shock that occurs when a surge of gas dispensing may be curtailed, with the fuel impacting against the interior of the hose, causing its expansion and contraction, and may result in a momentary reversal in the turn of the encoder disc 42. The slots 57 provided in row 54 overlap the slots 56, by some increment which is approximately twenty-five percent of the width of a period between adjacent slots 56, as previously explained.

In referring once again to FIG. 10, the period for each rate of fuel flow cycle in the low quantity or speed is determined between the leading edge of one slot 56, to the leading edge of the next adjacent slot 56. And, the quantity of flow gauged by the row of slots 53, being the lower quantity of flow gauge, is determined by the width of each slot, and the spacing between adjacent slots. Hence, one-one thousandths of a gallon of fuel is dispensed for each slot width, and in addition, one-one thousandths of a gallon of fuel is being dispensed for each space between adjacent slots 56. In addition, the channel 54 slots are used to determine the direction of flow of the fuel, as previously explained, with the slots 57 being overlapping in relationship with the slot 56 arranged just above thereof, so that each slot 57 will overlap approximately one-half of each slot 56, in addition to being approximately one-half of the space between adjacent slots 56. Hence, this overlapping relationship can be used as a gauge for sensing the direction of flow of the fuel, and whether it is being properly dispensed, or in the alternative, as a means for detracting or deducting from the quantity of fuel dispensed in the event that any hydraulic shock occurs within the fuel pump nozzle and hose which would cause the fuel to slightly flow in a reverse direction momentarily, as such occurs, thereby providing for a deduction from the overall quantity of fuel that has been dispensed. The binary logic signals developed by these slot arrangements have already been examined in the summary of this invention. Hence, precision is attained in the quantity of fuel being dispensed by the dispenser embodying this computer controlled pump. Thus, the channel 54 slots are used as a means for determining the direction of flow of fuel with respect to the quantity of fuel being engaged in the low speed of dispensing, as being determined by the channel 53 row of slots. On the other hand, when the fuel being dispensed is above a predetermined quantity, such as, in this instance, four gallons per minute, then the channel of slots which are arranged in row 55 become the means for counting of the quantity of fuel being dispensed, particularly at this higher rate of flow. These slots 58 provide an indication between alternate slots as from the trailing edge of one slot to the trailing of the next alternate slot as an indication of the dispensing of one-one hundredths of a gallon of fuel from the accompanying pump. The location of the various slots within the rows 53 through 55 are aligned in a particular fashion so that when the change over from determining fuel flow rate in channel 53, to a determination of the higher rate of fuel being dispensed by the pump as being gauged by the row of slots in channel 55, there will be a consistency in determining the rate of fuel flow between gaugings being performed by these two channels of slots. Thus, in the low speed determination, the center of each slot 56 is aligned with the leading edge of the slots contained within row 54. Likewise, the trailing edge of the slots 58, within the channel 55, will be aligned with centerline of slots 56. On the other hand, when the higher quantity of fuel being dispensed is engaged, as by channel 55, the trailing edge of each other slot 55, as previously explained, is aligned with the center of the aligned slot arranged above the same in channel 53, while each alternate slot will have its trailing edge aligned with the center of the space between adjacent slots 56 arranged in said channel 53. This is essential to provide precision in determining rates of flow, and quantity of fuel being dispensed, for this particular embodiment of the encoding disc of this invention. Obviously, other relationships may be just as likely set for the various slots provided within said disc, and function just as accurately when programmed through the computer of this invention for furnishing precise flow rate information for this pump.

Figure 12:
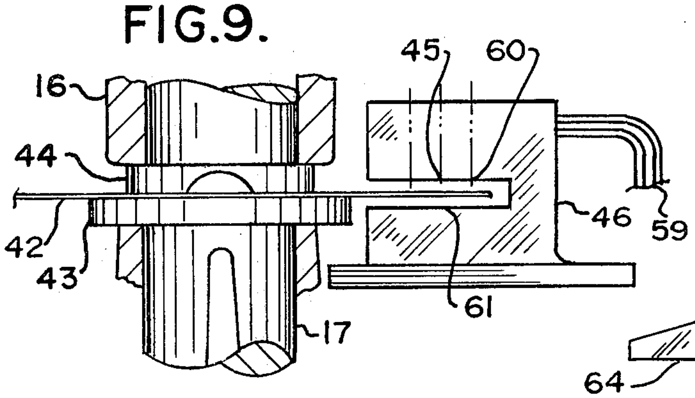
FIG. 12 provides a partial sectional view of the pulser assembly disclosing the encoder disc and its mounting shaft, with said disc being located partially through and within a gap provided within the sensor housing of the pulser.
Figure 13:
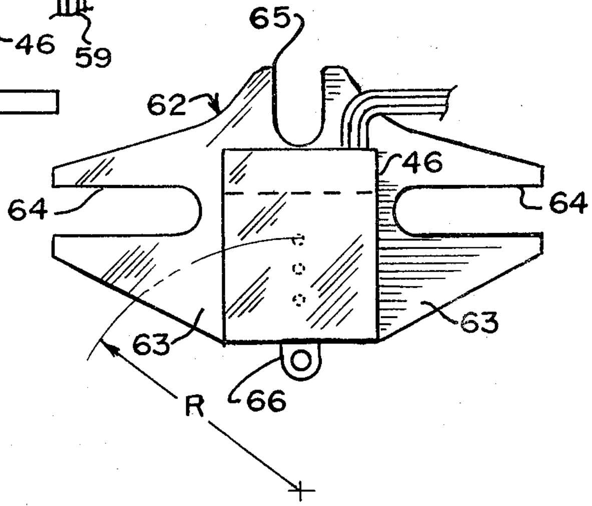
FIG. 13 provides a somewhat schematic view of the relationship between the encoder disc, as it passes through the gap of the sensor assembly, and showing the mounting and adjustment means for said assembly within the pulser.
Figure 11:
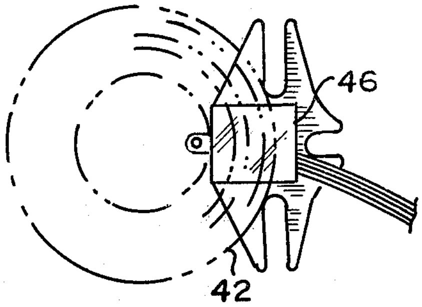
FIG. 11 provides a plan view of the encoder disc and the sensor assembly for the pulser.

The relationship of the encoder disc 42, as mounted upon its shaft 17, as arranged within the gap 45 of the sensor assembly 46, can be seen in FIG. 12. Likewise, the electrical wires 59 that provide for the conduct of charge to the sensor assembly are also shown. In addition, the relationship between the locating of the encoder disc 42 in passing through the sensor housing 46, and more specifically its gap, can also be seen in the plan view of FIG. 11. In the sensor housing 46, in the preferred embodiment, there are three light emitting diodes, as at 60, and three corresponding phototransistors 61 provided at the other side of the gap 45, in order to provide for the emission and collection of light through the various slots provided within the rows 53 through 55, as aforesaid. As can also be seen in FIG. 13, the mounting assembly 62 for securement of its integral sensor housing 46 to the pulser base plate 48 is shown. It also includes integral flanges 63 extending to either side, having slots 64 therein, for use for mounting by means of a fastener of the sensor housing to said base 48. In addition, means for adjustment of the positioning of the sensor housing 46 with respect to the base plate, and more specifically with respect to the various encoder disc slots passing through the sensor housing gap, can be accomplished through a manipulation of a tool (not shown) which fits between or within the slot 65 provided in the back side of said housing, as shown, and allows for the slight pivot of the said sensor housing 46 about its pinned flange 66, as shown. The flange 66 is pinned for pivot to the base 48 of the pulser, and by slightly pivoting to either side of the sensory housing 46, as previously explained, provides adjustment for conveniently aligning the slots 56 through 58 within the sensory housing gap 45, and more specifically aligning them with the light emitting diodes 60, and the phototransistors 61, as previously explained.

Figure 5:
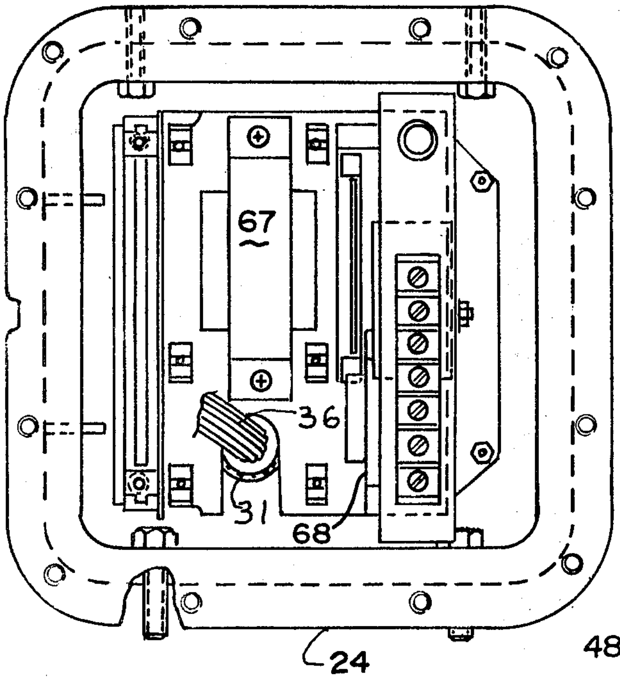
FIG. 5 discloses a view looking into the junction box, with cover removed, as taken along the line 5—5 of FIG. 3.
Figure 7:
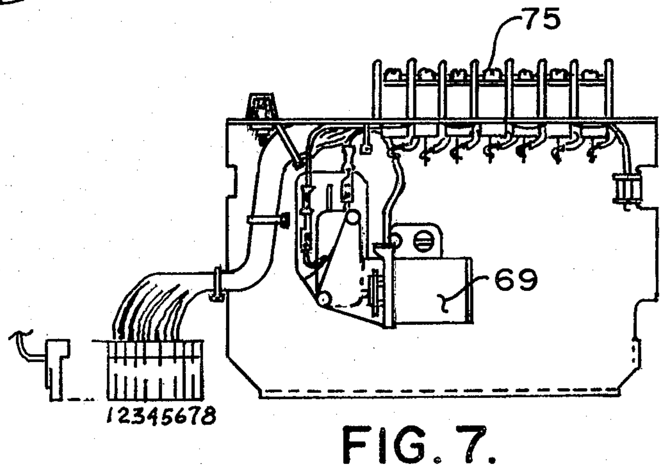
FIG. 7 discloses a plan view of the relay and terminal board located within the junction box, taken along the line 7—7 of FIG. 6.

As previously reviewed, this computer controller for the pump incorporates the explosion proof junction box 24. Contained within this junction box, as can be seen in FIGS. 5 and 6, are the various components, circuit boards, and transformers useful for the processing of the electrical charges conducted to the pump, and more specifically as first brought into the junction box for the same. As can be seen, the junction box includes a transformer 67 which functions to provide reduced voltage to the heater component of this invention. In addition, a transformer 68 provides the reduced voltages for operation of the various lights, and distribution of voltage to the various control circuitry of this computer. A relay 69 is provided for controlling the pump motor, which dispenses the fuel, and a terminal board 70 provides a means for connection of the wiring to the computer system, with said board being mounted upon a sheet metal guard 71 that surrounds these various components contained within the junction box. The junction box 24, as can be seen, has a cover 72 provided thereon, being rigidly fastened by means of bolts 73, which are highly resistant to impacting forces, and therefore, can prevent the forced opening of the junction box in the event that an explosion occurs therein. As can also be seen in FIG. 7, member 74 provides means for mounting of the terminal board, and the relay assembly 69. The terminal connections are shown at 75, while the relay 69 and its connection therein, is also displayed. A circuit board, mounted at 76, contains various resistors, diodes, and other electronic components to which the cables 36 are connected, and function to prevent hazardous voltages and currents from emanating from the box to other wiring contained within the circuitry of this invention. The chance that a spark may be generated is alleviated through this circuit board arrangement. Thus, the current being conducted through the cables 36, should any sparking occur exteriorly of the junction box 24, will be of such reduced magnitude and strength that it will be insufficient to cause vapor ignition.

Figure 16:
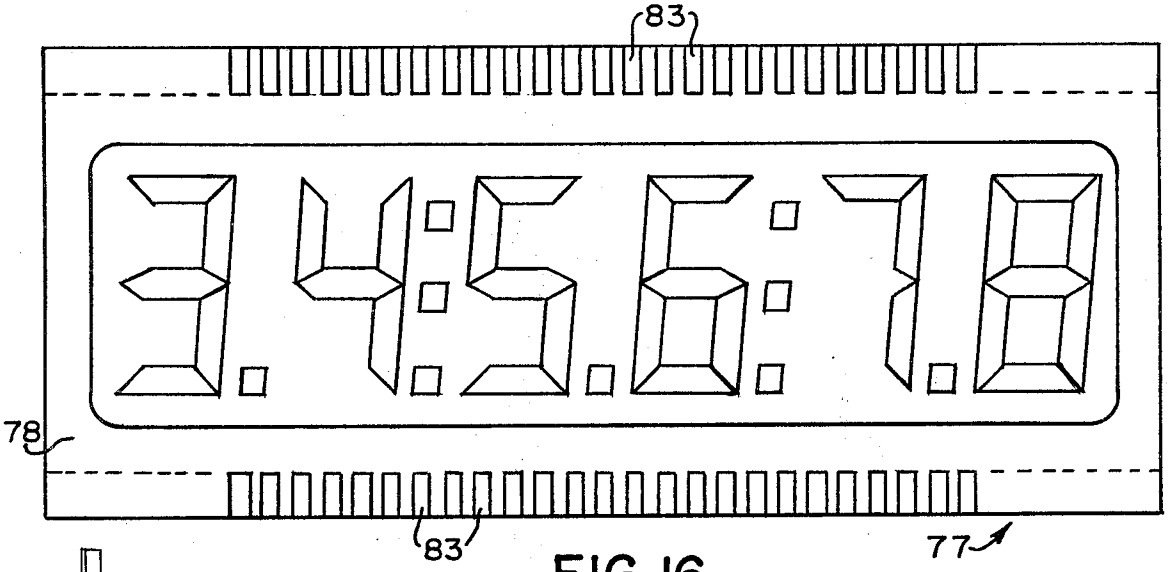
FIG. 16 discloses a plan view of the liquid crystal display used with the display assembly that is incorporated within the display panel assembly or display enclosure assembly of this invention.
Figure 17:
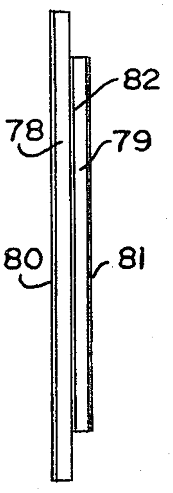
FIG. 17 provides an end view of the liquid crystal display of this invention, as shown in FIG. 16.

The data being processed by the computer of this invention is displayed to the customer, and the attendant, through the various display assemblies 76 that are mounted upon the aforesaid display panels 7 and 8. More specifically, and in referring to FIGS. 16 through 20, each display assembly includes a liquid crystal display (LCD) as shown in FIG. 16, at 77, and includes a pair of glass panels 78 and 79, and having laminated upon their outer surfaces the polarizers 80 and 81, with the polarizer 81 having the reflective surface thereon for providing better visual observance of the numerals being displayed upon the liquid crystal display. See also FIG. 17. As is known in this art, the liquid crystal display occurs intermediate the two glass panels 78 and 79, as at 82, and these type of displays are readily available upon the market through various sources. For example, Ladcor Incorporated, of Sunnyvale, Calif. manufactures and markets these types of displays. And as is also shown, along the peripheral edge of the larger panel 78 are a series of contact or terminal points or surfaces 83 through which current is conducted for generating the display of numerical figures upon the liquid crystal display. This display 77, and more specifically its panels 78 and 79 are mounted within the bezel 84. A back lighting panel 81*a* is arranged under the glass panel 79, and effectively absorbs light, to make the liquid crystal display more easily seen at night. See also FIGS. 18 through 23. Also contained within the package is a heater 85, in order to maintain the proper operational temperature for each display, so that it will exhibit its desired characteristics and numbers regardless of what may be the ambient temperature and environmental conditions prevailing in the vicinity where a dispenser 1 is located. Beneath the heater 85 is an elastic means 86, which has a tendency to force the various components together, and more specifically the heater 85 against the underside of the glass panels 78 and 79, and their associated polarizers 80 and 81. The bezel 84, and the various components just described are secured together and held within said bezel by means of fasteners 87 that secure a circuit board 88 to the display assembly.

Figure 18:
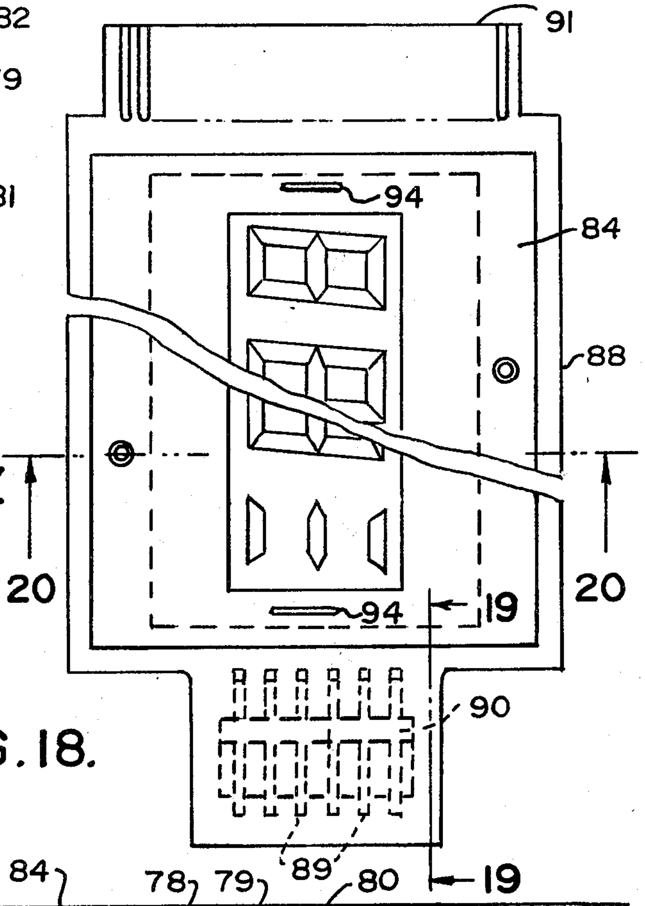
FIG. 18 provides a fragmentary plan view of the display assembly of this invention.
Figure 19:
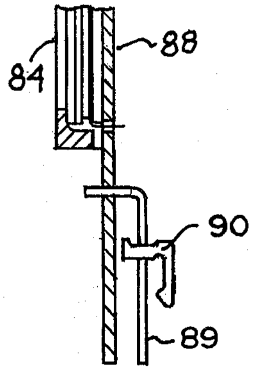
FIG. 19 furnishes a partial sectional view of one end of the display assembly, taken along the line 19—19 of FIG. 18, and showing the connector pins for the heater of the same.
Figure 20:
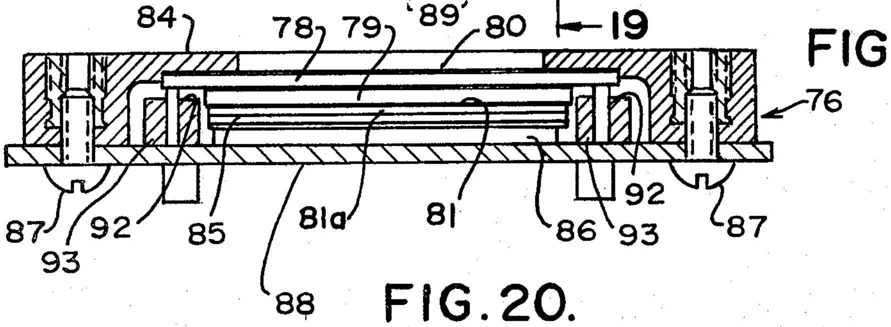
FIG. 20 provides a sectional view of the display assembly, taken along the line 20—20 of FIG. 18.
Figure 21:
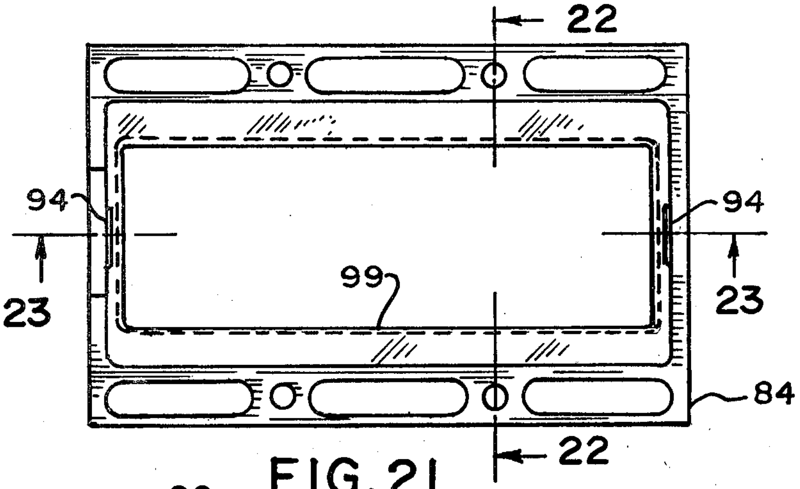
FIG. 21 furnishes a plan view of the bezel useful for positioning the liquid crystal display within the assembly.
Figure 22:
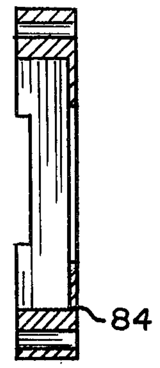
FIG. 22 provides a sectional view of the bezel taken along the line 22—22 of FIG. 21.
Figure 23:
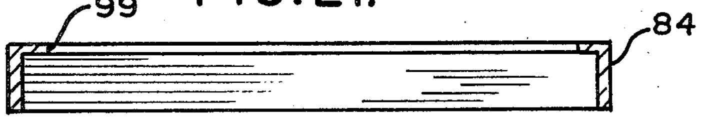
FIG. 23 provides a sectional view of the bezel taken along the line 23—23 of FIG. 21.

This circuit board 88 includes means for providing its electrical connection with wiring leading to the display assembly, and as can be seen in FIG. 18, it includes a series of electrical pins or terminals 89, held by a bracket 90, at one end of said board, with these terminals being useful for accommodating the transmission of energy to the heater for this assembly, and the various lights required for its illumination.

The opposite end of said circuit board includes the terminals 91 that conduct current to the circuit board 88 for transmission of predetermined energy to the assembly for energizing and displaying the proper data upon its LCD. Current conducted to the terminals 91 are transmitted through an elastomeric conductor 92, supported by retainers 93, and which elastomeric connectors conduct current from said circuit board 88, along predetermined paths, to the contact surfaces 83 of the LCD, or more specifically its plate 78. As an example of the operation of this type of display, numerical figures, as can be seen in FIGS. 16 and 18, are displayed through the surface of the plate 78, with said displays being energized by voltages conducted from the computer to that vicinity between the said plates 88 and 79, where the energizable liquid crystal is located, as along surface 82. Where the LCD is to be illuminated, as just previously explained, by the conduct of current through its terminals 89, there may be included the electro luminescent panel or back lighting panel 81*a*, as previously explained, that will be contiguous with the underside of the polarizer and reflective member 81, and it will be pressure fitted or biased against the underside of said member by means of the compression generated through the resilient means, or cushioning means 86. The positioning of the bezel 84 upon its circuit board 88 is essentially obtained through the connection of the fasteners 87, with the convenient location of the various plates of the LCD, as previously explained, capable of being further centered within the bezel by means of its integrally formed locating slots 94.

Figure 26:
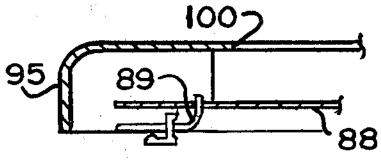
FIG. 26 provides a partial sectional view of an edge of the display assembly, including the display enclosure assembly, and showing the location of the heater connector pins of this invention, taken along the line 26—26 of FIG. 24.
Figure 24:
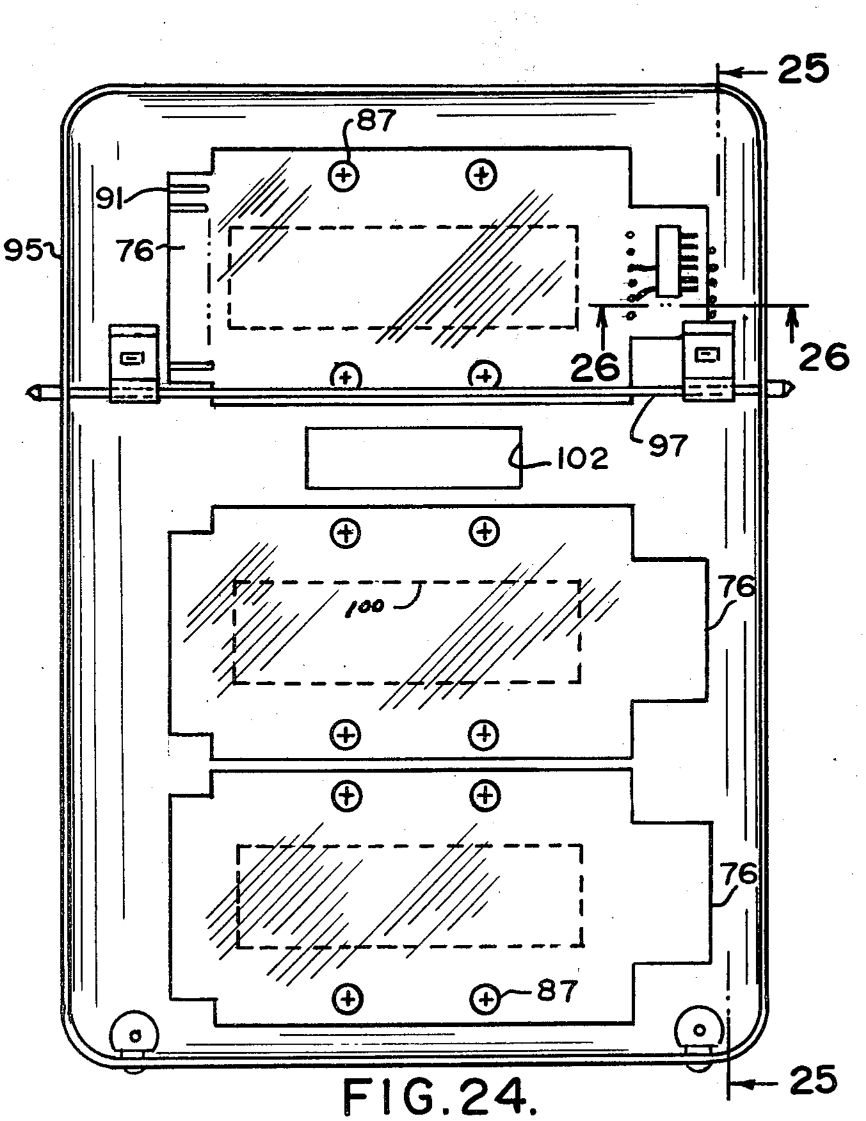
FIG. 24 provides an interior plan view of the display enclosure assembly of this invention, showing the location of three of the display assemblies of this invention.
Figure 25:
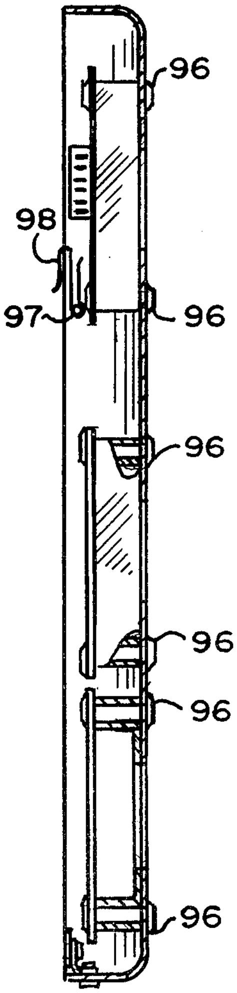
FIG. 25 provides a heighth-wise sectional view of the display assembly enclosure taken along the line 25—25 of FIG. 24.
Figure 27:
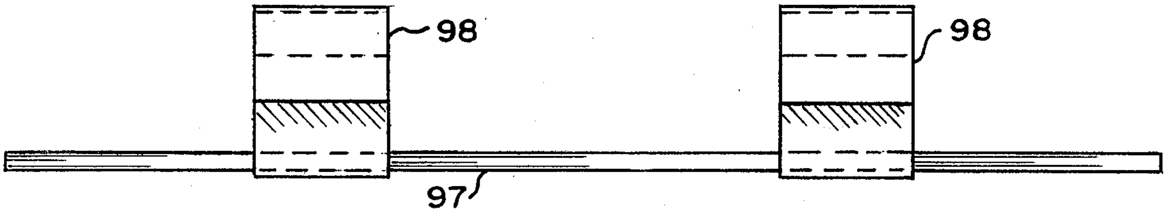
FIG. 27 provides a view of the clamp mounting rod useful for supporting the display enclosure upon the display panel of a fuel dispenser.
Figure 28:
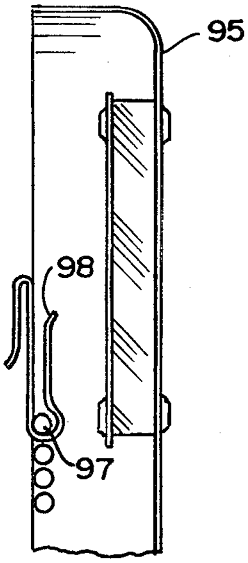
FIG. 28 provides a partial side view of the display enclosure showing the location of the clamps previously described in FIG. 27.

While the mounting of the display assemblies 76 upon the display panels 7 and 8 customarily take place in the manner as shown in FIG. 3, where the entire computer controller may be installed within a new installation, the concept of this invention is also to provide for the installation of this computer controlled pump within the standard or existing dispenser, as a means for providing conversion to more modern technology and equipment, and providing for computer, as distinct from mechanical, accounting of the fuel dispensing function. As can be seen in FIGS. 24 through 26, an alternative method for mounting of these display assemblies upon the surface of the existing dispenser panels can be obtained, and this is achieved through the usage of a display enclosure assembly 95 that is designed having dimensions and size that provide for its convenient retrofitting upon the surface of existing dispenser panels, but yet within the confines of the existing front glass panel provided upon existing dispensers. The display assemblies 76 are secured to the enclosure 95 by means of the fasteners 96, in order to provide for rigid and stable support of these assemblies contiguously against the interior surface of the enclosure 95. All of the features of each display assembly 76 are the same as previously described, having their various connecting pins 89, and terminals 91 provided along their marginal edges, as shown. The fastening of the display enclosure 95 to the surface of the existing panel of the dispenser includes any means for securement of the same thereto, and such may be accomplished by the use of fasteners, screws, or the like. But, to facilitate the mounting of the enclosure thereon, a particular type of fastener is recommended, and this includes the locating of a rod 97 transversely across the enclosure 95, extending through apertures provided in its sidewalls, as shown, and having one or more clamps 98 suspended thereon for insertion through slots provided on the surface of the mounting panel. See the relationship of these components in FIGS. 27 and 28. Thus, when the enclosure 95 is mounted through these fasteners 98 to the surface of the existing display panel of the dispenser, the display assemblies 76 conveniently display their liquid crystal formed data through the apertures 99 formed in each bezel 84, and likewise, such data is displayed additionally through the aligned apertures 100 formed through the front of the display enclosure 95, as can be seen. Likewise, and with regard to the display of such data, it can conveniently be seen, as from FIG. 2 that similar type data is readily displayed through the existing apertures 101 provided through the display panels 7 and 8, as previously analyzed, when the permanently mounted displays 7 and 8 are utilized. Furthermore, the display enclosure 95 includes a slot 102 formed therethrough, for display of the data determined by the mechanical totalizer 9, and in addition, a similar type of slot 103 is provided through the surface of the form of display panel 7 for also displaying the data accumulated by said mechanical totalizer 9. Thus, equivalent data can be displayed upon both the more permanent forms of display panels 7 and 8, as previously reviewed, and in addition, such data can be conveniently displayed through the more portable type of display enclosure 95, which, as previously explained, is the type of data display that can be mounted onto existing dispenser pumps, without necessitating a complete dispenser display changeover.

Figure 29:
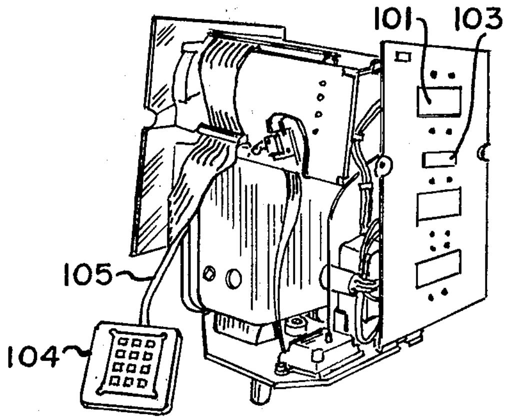
FIG. 29 provides an isometric view of the computer controller for fuel dispenser, and further showing the keyboard assembly useful for the input and initiating readout of information and data required for proper operations of this invention.
Figure 30:
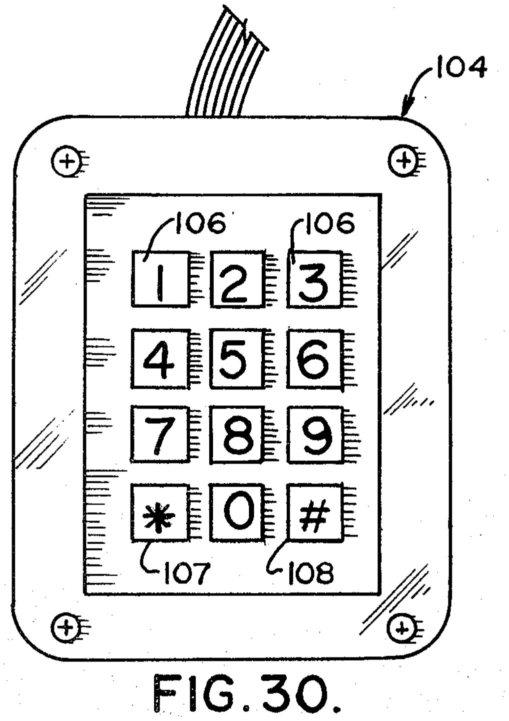
FIG. 30 provides a plan view of the keyboard pad for this invention.

This invention also contemplates the provision of data upon a more totalized basis for the benefit of the station operator, in addition to displaying the type of data, as previously explained, that may be and is pertinent to his individual customer. Thus, the station operator, at some period of time, whether it be daily, weekly, etc., may desire to know the total amount of fuel dispensed, in gallons or liters, etc., and in addition, learn the number of transactions conducted over a period of time, and in addition, the total dollar sale of such dispensed fuel. Furthermore, diagnostic information regarding the electronic workings of the computer controller can also be obtained from this invention, and this is essentially initiated through the use of a keyboard means 104, as shown in FIGS. 29 and 30. This keyboard connects through its electrical lines 105 into the computer assembly of this controller, and includes a series of keys 106, as can be seen. Essentially, the digit key 0 through 9 are useful for inputting pricing information into the computer memory, and this is initiated first through the actuation of the key 107, as shown. This inputs pricing information into the computer, and more specifically the price per gallon, or some other quantity, of the fuel being dispensed. The key 108 is used for providing a readout of the accumulated totals from the memory of the computer, as previously explained, and through a series of consecutive pressings of this particular key, information relative to the total volume, number of sales, and dollar volume of sales, can be obtained.

Figure 31:
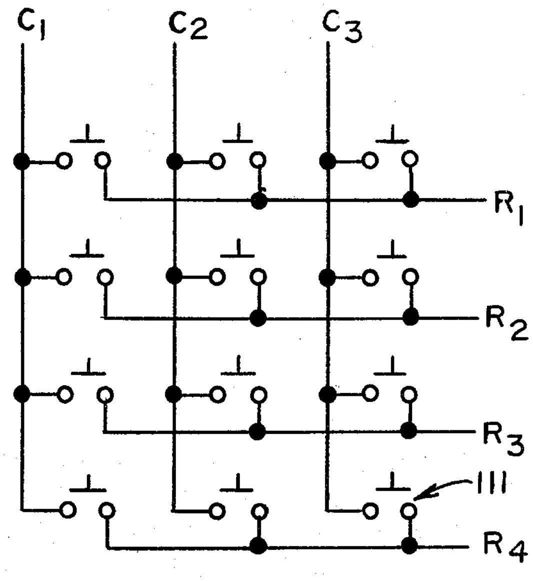
FIG. 31 furnishes an electrical schematic for the keyboard control as shown in FIGS. 29 and 30.
Figure 32:
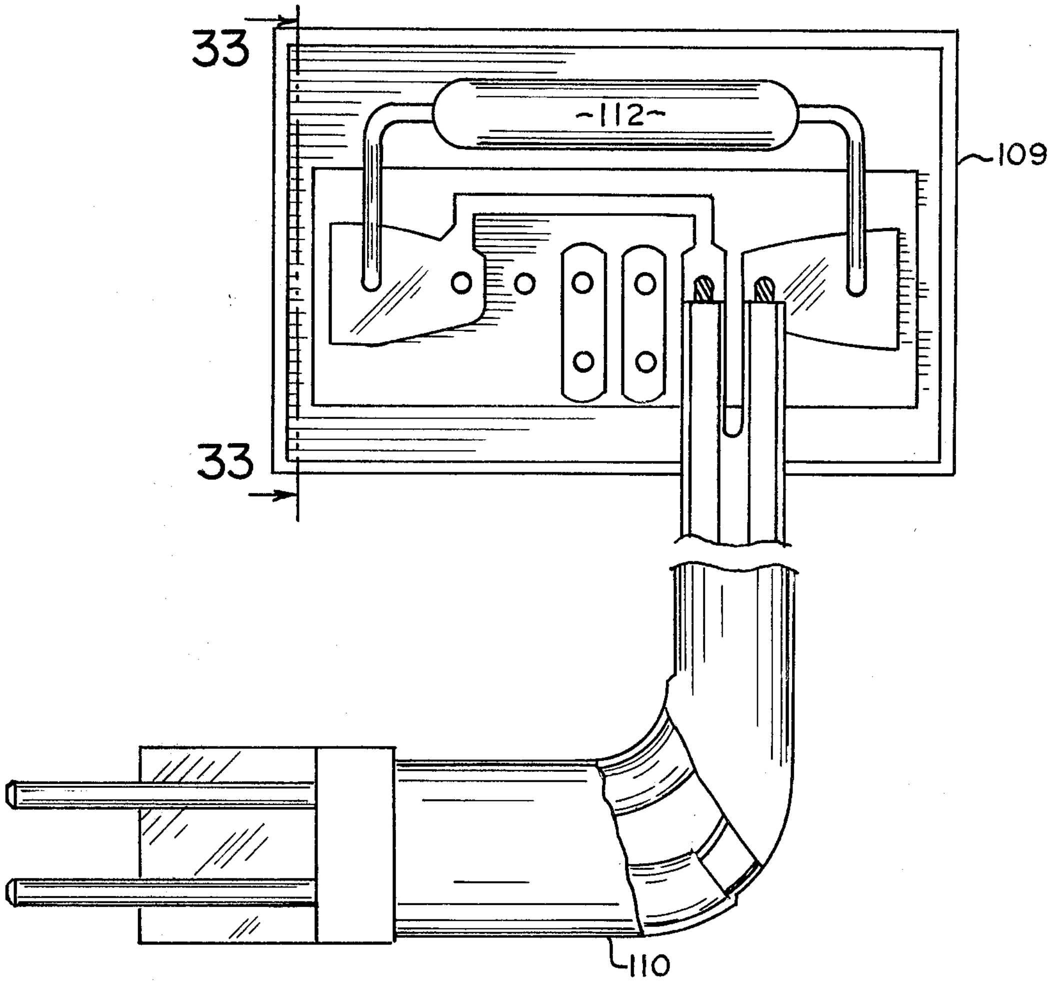
FIG. 32 provides a plan view of the remote access terminal for obtaining totalized information relative to the dispenser's operations.
Figure 33:
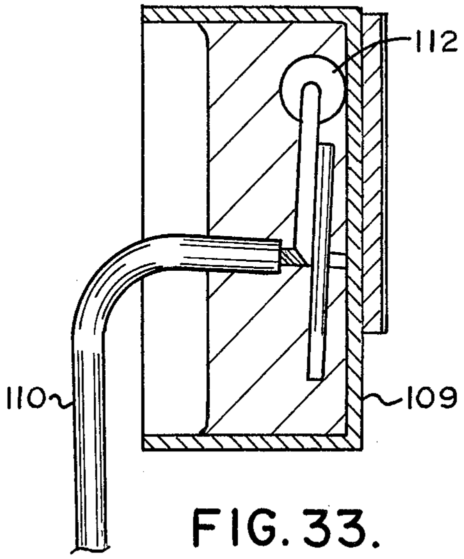
FIG. 33 provides a side view of the remote access terminal of FIG. 32.

The schematic circuit diagram for this keyboard 104 is shown in FIG. 31. Its relationship to the circuit diagram for the computer if this invention will be subsequently explained. This keyboard 104 is normally contained within the housing of the dispenser, and is inaccessable to the station attendant, or anyone else, unless he utilizes means for unlocking of the same.

Where the station operator wishes to obtain prompt information regarding periodic totals of sales, etc., of fuel being dispensed, one can utilize the remote operative magnetic sensor 109, as shown in FIGS. 32 and 33. Essentially, this connects by means of its cables 110 into the keyboard 104, and functions as a parallel connection with the key 108 of said keyboard, which is essentially that key shown in the schematic diagram at 111. This sensor 109 is arranged adjacent the inner surface of the glass shield provided upon the faceplate of the dispenser, as at 3, as explained in FIG. 1, and by moving a magnetic probe or wand (not shown) across the exterior surface of said glass panel, contact is created through the switch 112, which is a Reed type switch, for providing contact through the switch 108 of the keyboard 104. By continuing the actuation of the switch 112, consecutively, the various data, as previously explained, relating to the total volume of gasoline dispensed, the number of transactions occurring, and a total dollar volume of sales, over a particular period of time, can be quickly determined remotely without necessitating the attendant unlocking and entering into the computer controller of the dispenser 1. This information is displayed upon the upper part of the display assembly 76 of the display panels.

Figure 34:
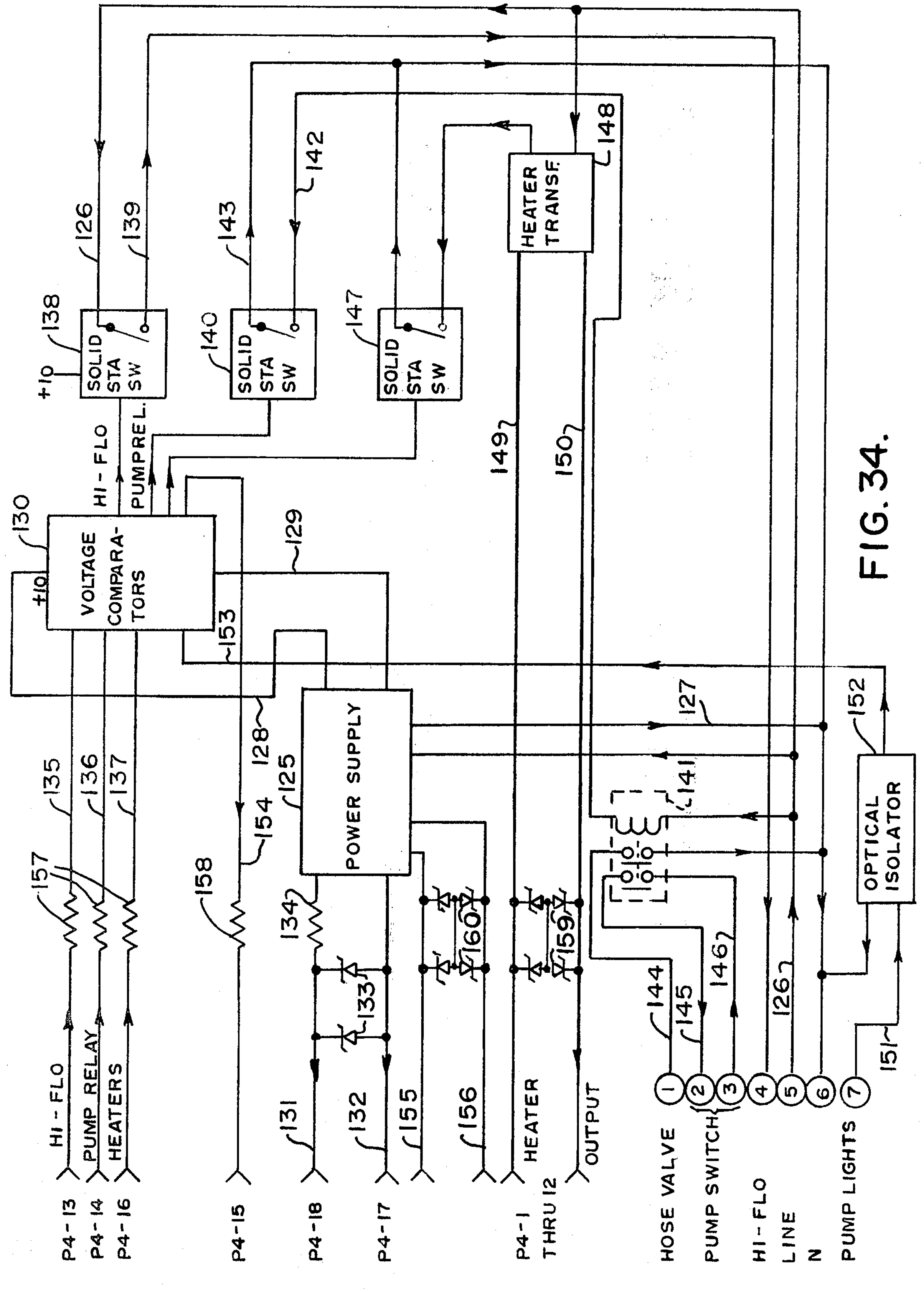
FIG. 34 furnishes a circuit diagram of the electrical components contained within the junction box of this invention.
Figure 35:
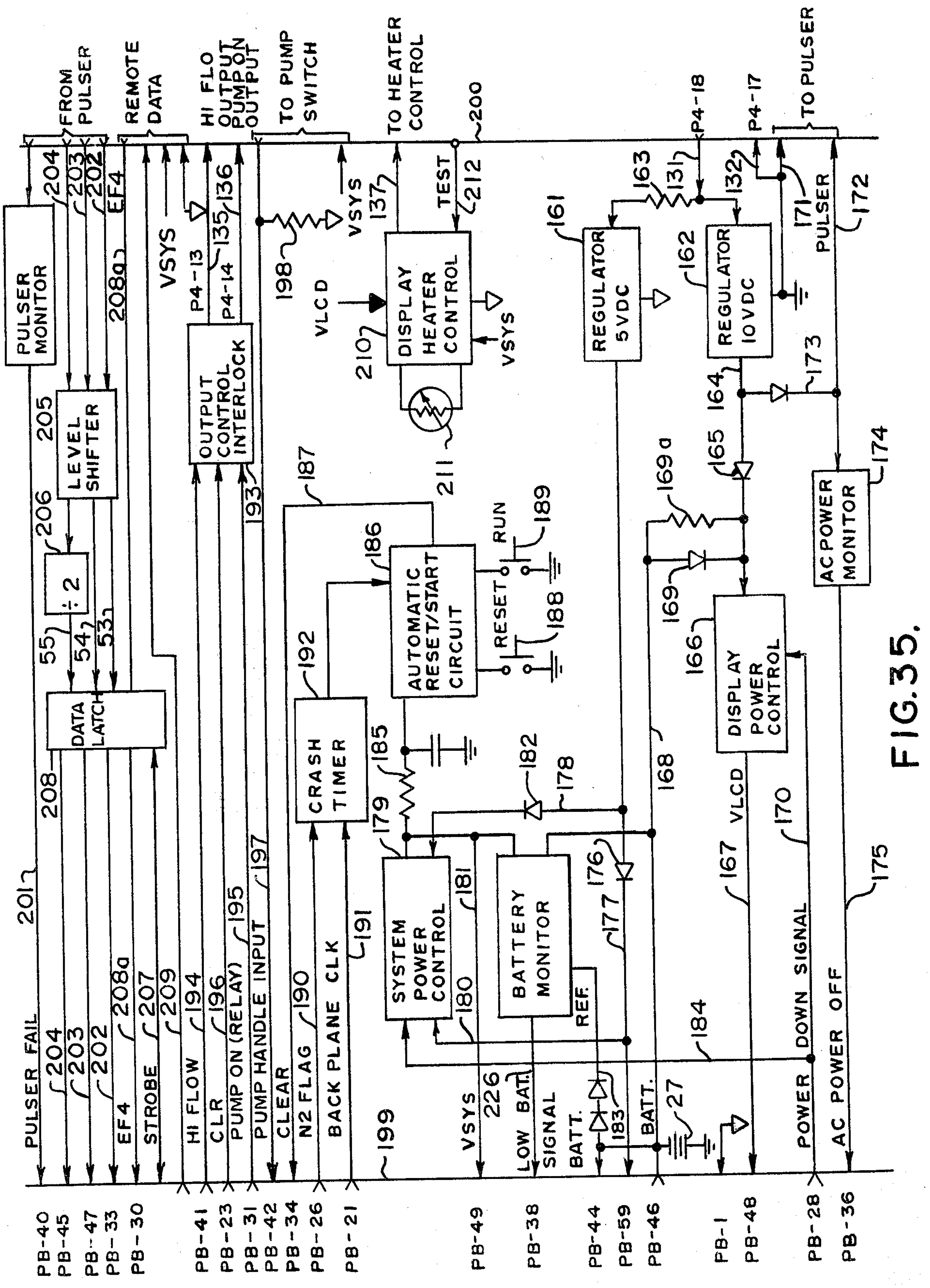
FIG. 35 provides a circuit diagram of the electrical components contained on one of the circuit board cards, or the CPU II, located within the card cage of this invention, and showing part of the central processing unit of this invention.
Figure 36:
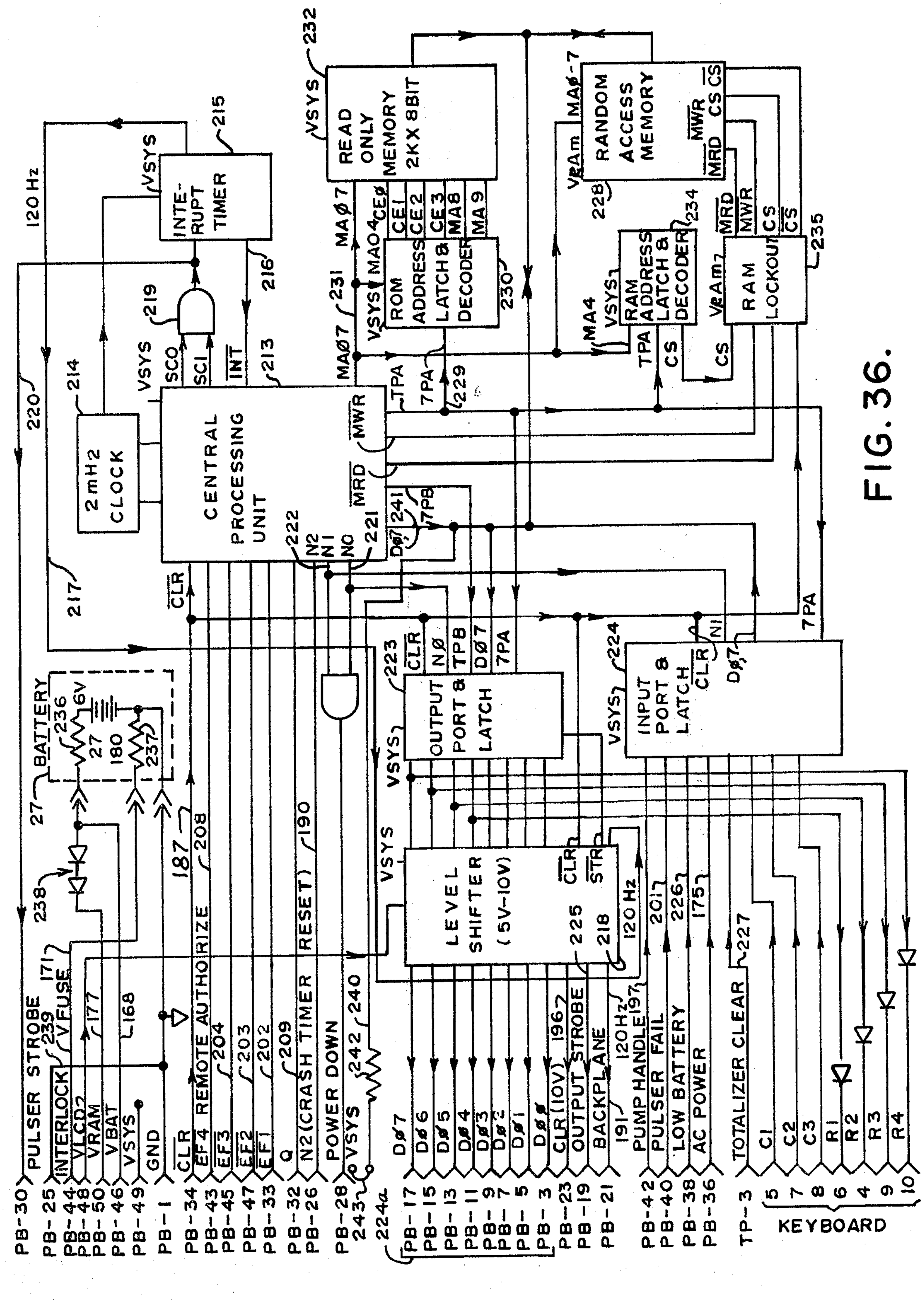
FIG. 36 provides a circuit diagram of the computer components contained upon another circuit board, or the CPU I, located within the card cage of this invention, and showing the computer components of the central processing unit.
Figure 37:
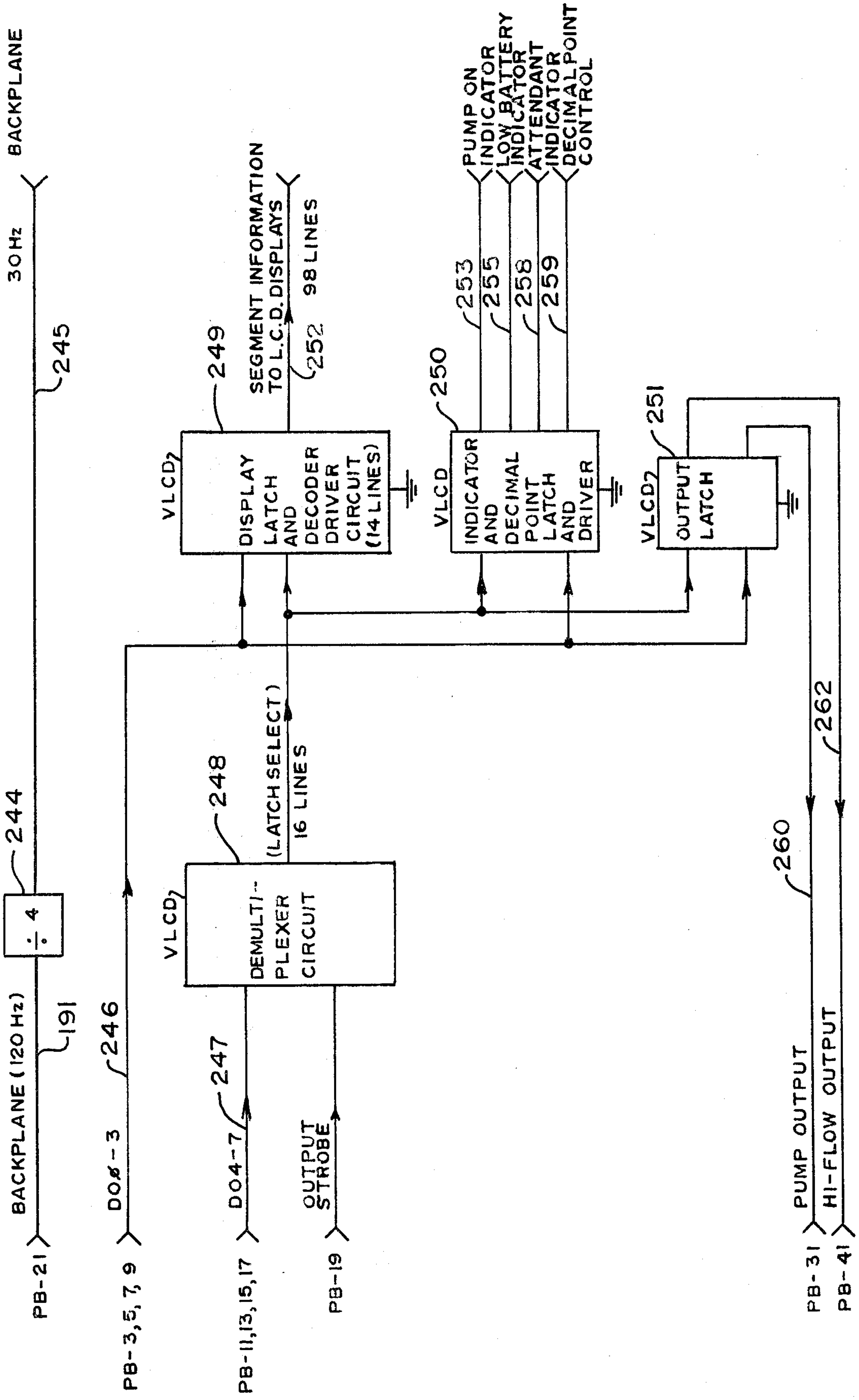
FIG. 37 provides a circuit diagram of the electronic components used for processing the signals conducted to the liquid crystal displays for the readout of data and provision of displayed information.

The circuit diagram associated with the operations of this invention, and which provides for the electrical operations of the same, are shown initially in the block diagram provided in FIG. 34, while the more detailed circuits for this invention are provided in FIGS. 35 through 37.

The various electrical components and electronic elements, in addition to their interconnecting circuitry, for providing the electrical operations for this computer controlled fuel pump is shown in the FIG. 34. As displayed therein, these various components, and the circuit lines, provide those controls that are contained within the junction box 24 of this invention, as previously described.

As shown, the initial component contained within the said junction box includes a power supply 125, which has electrical current conducted to it by way of the circuit line 126 and its accompanying neutral 127. This power is in the category of 120 volts at the usual amperage level. This power supply is designed for stepping down the line voltage to somewhere in the vicinity of 14 volts rms, it includes the usual step down transformer for accomplishing such and also includes rectifier means for converting the alternating voltage to a dc voltage. The usual components of this power supply are rather standard, such the transformer, rectifier, and voltage regulator, for accomplishing the voltage reductions as previously described. The output from the power supply is conducted through the circuit lines 128 and 129 for conduct of its current, at a 10 volt level, to the voltage comparators 130 of this invention. These can be obtained from National Semiconductor, of Santa Clara, Calif. In addition, charges conducted by way of the circuit lines 131 and 132 to the pin connectors, as shown and the current across these lines is maintained at approximately 14 volts. Its current is conducted to the computer of this invention, to sustain its electrical operations during application within the type of fuel dispenser 1 as previously analyzed. The electrical voltages derived from this power supply are used for the purposes described, in the operations of this power supply, for particularly stepping down the line voltage conducted to it, as is well known in the art.

It can also be seen between the circuit lines 131 and 132 that there are contained a pair of Zener diodes 133, and these are arranged in parallel between the two circuit lines, and are designed for limiting the peak voltage across said lines to the 14 volts, as aforesaid, and in conjunction therewith, the circuit line 131 contains a resistor 134, whose purpose it is to maintain or limit the current conducted through the circuit lines to a significantly low level so that in the event any spark shall occur in the proximity of these lines, it will be insufficient to create any explosion within the ambient fuel vapor environment that may prevail outside of the junction box, where these circuit lines 131 and 132 extend. As previously explained in the description of the mechanical aspects of this invention, an epoxy material **34*a* surrounding an elastomeric packing 34 is contained within the pipe barrier 31, for the purpose of physically sealing off the interior of the junction box 24 from the ambient air surrounding it, so that the junction box becomes explosion proof. And, since most of the higher voltage and charges are being converted within the junction box, it is then desirable that the line voltage conducted externally of the same be at these lower voltages, and limited to a lower amperage, as previously described, with respect to the circuit lines 131 and 132, so that the voltage conducted externally of the junction box, as through its pipe barrier 31**, will be insufficient to create that spark which may otherwise cause an explosion of the fuel vapors that may pervade externally of the said junction box.

The voltage comparators 130 are designed to provide a sensing of the voltage difference across the circuit lines 135, 136, and 137, with respect to the reference voltage provided within the voltage comparator as through the circuit line 129, so that when a signal is generated from the computer by way of the high flow line 135, or the pump relay line 136, and the voltage is maintained at, for example, a 10 volt level, with respect to the five volt level along the circuit line 129, the voltage comparator 130 senses this difference, and then instructs certain other electrical components to initiate further action. For example, when the voltage difference is detected in the voltage across the circuit line 135, the voltage comparator senses this difference, and then instructs a solid state switch 138 to be triggered, which then initiates or shuts off the high flow of gasoline being dispensed by the pump. This is achieved by an internal switch contained within the solid state switch 138, and which has the line voltage 126 connected to it, at one terminal, while the high flow line 139 connects with the opposite terminal of said switch. Thus, when there is 10 volts applied to the high flow line 135, the switch 138 will remain closed, allowing for the high volume flow of gas to be dispensed by the pump. On the other hand, when the voltage of the circuit line 135 drops to 0, by instructions from the computer of this pump, the switch 138 opens, thereby curtails any further high flow of fuel from the said dispenser.

The pump relay, or more specifically its circuit line 136 leading from the computer of this invention, operates similarly to the high flow line previously described, wherein its voltage is sensed by the voltage comparator 130, to determine its voltage level with respect to the reference through the circuit line 129, so that when the voltage differences can be detected, its solid state switch 140 is maintained in closure, thereby allowing the line current through the circuit line 143 to be conducted through the pump relay 141, which is turned on through closure of the solid state switch 140, and allows the conduct of current to the circuit line 142, to said switch, and through the circuit line 143 to neutral. But, this action has effectively closed the pump relay 141, which allows the pumping or dispensing of fuel to be accomplished. But, when the pump relay is to be instructed into closure, the voltage maintained through the pump relay circuit line 136 drops to 0, or some figure lower than the reference voltage at the circuit line 129, and this difference is detected by the voltage comparator, which then opens the solid state switch 140, and which thereby effects an opening of the pump relay 141. As can be seen, when the pump relay 141 is opened, through an opening of the switch 140, all contacts within the relay are opened, which means that the hose valve energized by the circuit line 144 will not be opened, which means that the hose valve will be closed to prevent the dispensing of gas. In addition, upon opening of the pump relay 141, the pump switch, which controls the pump motor, will also be opened through its connection with the circuit lines 145 and 146.

The voltage across the circuit line 137 also provides a signal from the computer which when maintained at a particular voltage, can be detected by the voltage comparators, with respect to the reference voltage at circuit line 129, and when that voltage difference prevails, the solid state switch 147 is closed, and which provides a signal for the heater transformer 148 to be energized, which provides an output of current for operation of the heaters 85, associated with each display assembly 76, to be energized, and to maintain a constant temperature at said display assemblies so that the liquid crystal display will operate satisfactorily. This current is conducted through the circuit lines 149 and 150 to accomplish such.

In addition to providing a heated environment for the liquid crystal display assemblies, it is also desirable to provide some illumination of said displays, so that they can be more easily read, particularly at night. The circuit line 151 is connected with the pump light, and its circuit line connects with an optical isolator 152 which provides a reference voltage along the circuit line 153 to the voltage comparator 130, and which is referenced with respect to the circuit 129, so as to provide an indication that the pump lights have been or are illuminated. This optical isolator is acquired from Vactec Incorporated, Maryland Heights, Mo. When this occurs, the voltage comparator provides an output through the circuit line 154 and to the controller circuitry that regulates various other lighting of the pump, and which also contains a sensor, to determine if the lighting conditions are sufficient enough to warrant the illumination of the electro luminescence panels 81*a* of the display assembly 76. When the need for such lighting is detected, then another relay (not shown) and associated with the circuit lines 155 and 156 is switched on, thereby allowing the power supply to conduct charge to the electro luminescent panels 81*a* of the display assembly 76, to provide for this illumination of the said liquid crystal displays.

It might also be noted that within the circuit lines 135, 136 and 137, there are current limiting resistors 157 contained therein, and these resistors are designed to maintain a control upon the maximum line voltage that may be conducted through these lines, so that in the event any spark occurs exteriorly of the junction box 24, such spark will be insufficient to cause an explosion thereat. In addition, a similar type current limiting resistance 158 is provided within the circuit line 154, for the same purpose. In addition, back to back Zener diode circuits, one as shown at 159, and another as shown at 160, are provided between the circuit lines 149 and 150, and 155 and 156, respectively, for the same purposes as previously analyzed to furnish a limit to the amount of voltage maintained across said lines, and the charge to be conducted therethrough, since alternating current is being conducted through these lines, for the purpose of diminishing the possibility of an explosion producing spark at these locations, particularly externally of the junction box 24. Thus, spark ignition is diminished through the use of these various resistance and Zener diode controls that are maintained within their various display circuit lines, so that the hazard of fire or explosion is alleviated, particularly externally of the junction box 24.

The foregoing description of the various electrical circuitry and controls, provides an analysis of the operation of the electrical circuitries of this invention with respect to those components contained within the junction box 24 of this invention. On the other hand, various other electrical circuitry, and electronic control components, are also associated particularly with the computer operations of this invention, and this circuitry is disclosed in more detail in FIGS. 35 and 36, and which will be hereinafter described. The CPU I board is shown in FIG. 36, while the CPU II board is shown in FIG. 35. Both of these boards are contained within the computer housing or card cage 11. More specifically, FIG. 35 discloses circuitry, and various electrical components, for providing an interface between the computer of this pump and the various operating components, essentially acting as a monitor to assure their proper operation at particular times within the system usage. As can be seen, the output power from the power supply 125 is conducted through the circuit lines 131 and 132 and to various voltage regulators 161 and 162. The current to the regulator 161 passes through a resistor 163, and which resistor functions as an isolator to prevent the effects of capacitors contained within these two regulators from having an effect upon each other. The regulator 161 is a 5 volt direct current regulator, and which may be of the type that may be acquired from a variety of sources, such as the Motorola Company, of Tempe, Ariz. The voltage regulator 161 provides an output of 5 volts which is useful and required for operation of the central processing unit of the computer of this invention. On the other hand, the regulator 162 provides an output of 10 volts dc, and which is useful and required for operation of the various liquid crystal display assemblies 76 of this invention, in addition to the battery 27 recharging, and also, for operations of the pulser 15, as previously analyzed.

The circuit line 164 leading from the regulator 162 is conducted through a diode 165 and then to a display power control 166 which provides line voltage for operation of the aforesaid liquid crystal displays, associated with the display assemblies 76, as previously described. This voltage is conducted through the circuit line 167. The current from the battery 27 is conducted through the circuit line 168, and through its associated diode 169, so that when power from the regulator 162 is shut off, current from the battery will be conducted to the display power control 166. On the other hand, while the regulator 162 is on and operating, some current will be provided through the resistor 169a and to the battery 27, to sustain its recharging during routine usage of this dispenser. But, as previously explained, when power to the regulator 162 is curtailed, then the current from the battery passes through the diode 169, and to the display power control. But, a power down signal is conducted through the circuit line 170 and to control 166, and is timed so that the line voltage from the battery to the control 166, and on to the display assembly 76, will only prevail for a limited period of time, which in this instance, may be approximately one hour. This allows for the operator to read his totals from the pump, as at the conclusion of a service day, or when power may have been disrupted from other sources, such as by means of electrical failure from the power company, or when a storm or otherwise may have disrupted power to the station. The display power control 166 generally comprises a PNP switching transistor which acts as a switch for conducting current from the circuit line 164, or line 168, through the circuit line 167, and onto the display assembly 76, as previously explained. Current through the circuit line 132 is also conducted with the circuit line 171 and the circuit line 172 for providing current for operations of the light emitting diode and the photo transistor of the pulser sensor assembly. The current through circuit line 172 is derived from the regulator 162, through the circuit line and its accompanying diode 173, and in the event that the ac line voltage to the power supply 125 is curtailed, this loss of power will be detected by the ac power monitor 174 and which signals through its circuit line 175 for signaling the computer that the ac power supply has been disrupted. The ac power monitor 174 includes a Zener diode and switching transistor which, when the 10 volt charge is curtailed, voltage from the 5 volt regulator provides a high level signal along circuit line 175 to the computer.

Line voltage from the 5 volt dc regulator 161 conducts current through the diode 176 and to the random access memory of the computer, through the circuit line 177.

In addition to the foregoing, current from the regulator 161 is also conducted through the circuit line 178 and to the power system control 179. This control is obtained from Motorola Semiconductor Products, of Tempe, Ariz. And, in the event that power from the regulator, or system power, is shut off, then current from the battery 27 is conducted through the circuit line 180 and to the system power control 179, which allows for the application of power from the regulator 161, or from the battery 27, to conduct current through the circuit line 181 to provide for system voltage. These diodes are shown at 182 and 183, respectively. In addition, there is a switching transistor contained within the system power control 179, and it receives the power down signal by way of the circuit line 184, instructing the system to operate for one additional hour, by way of battery power, so that data may be obtained from the dispenser by the operator, as desired.

When the ac power is supplied to the pump, as at the commencement of a day's operation, a signal from the power system control passes through the circuit line 185, to the automatic reset start circuit 186, and which transmits a clear signal through the circuit line 187 which effectively forces the computer through its initialization program. In addition, this function may be manually done by operating the reset switch 188 to close, followed by operating the run switch 189 to close, resulting in the conduct of a signal by way of the circuit line 187 for initializing the computer, as aforesaid. The circuit 186 contains a series of capacitors and one shot, which generates a pulse or signal upon the cleared line 187. The circuit lines 190 and 191 provide a constant monitoring of the operations of the computer, so that the crash timer 192 can detect when any misfunction is being performed by the computer, and thereby signal the reset-start circuit 186 to signal a clear to the computer along the circuit line 187, in order to initialize its operations. The N2 flag along line 190 receives a timed sequence of pulses from the computer when it is operating normally, but in the event no signal is received from the computer, the crash timer 192 will detect the same, to provide for this computer initialization, In addition, the back plane clock circuit line 191 receives the clock signal for gauging the signals received over the N2 flag line, so that the two received signals can be constantly compared for determining whether the computer is functioning properly, or has encountered some problems and requires a resetting. A crash timer 192, is of the type customarily used in the art, and contains a counter for counting the various signals received over the circuit lines 190 and 191. This crash timer can be obtained from Motorola Semiconductor Products, of Tempe, Ariz.

An output control interlock 193 is provided within the circuitry, and receives a latch signal from the computer by way of the high flow line 194, while simultaneously receiving the pump on signal by way of the circuit line 195. This interlock can also be obtained from Motorola Semiconductor Products. The current conducted upon the high flow line 194, which is the signal from the computer, in addition to the pump on relay line 195, each pass through the output control interlock 193, with the clear line 196 acting as the determinate as to whether the computer is functioning properly, and that the flow lines and pumps may continue to function. Signal along the clear line 196 is similar to that signal passing along the circuit line 187, with the exception that the clear signal through the circuit line 187 is at the 5 volt range, whereas the signal through the clear line 196 has been shifted into a 10 volt level. Assuming that the computer is operating properly, then signals are passed through the circuit lines 135 and 136 for providing functioning of the voltage comparators as previously analyzed. The circuit line 197 connects with a manually operative switch 37 which is provided to the side of the card cage 11 of the pump, as previously explained, and when turned on, provides a signal to the computer that a new transaction is about to commence. This indicates to the computer that a customer or the station attendent wishes to use the pump and dispense fuel to a vehicle. When the switch is opened, and while current may be conducted across the line 197, such current is grounded through the resistance 198 until that time when the switch is turned on, and current is allowed to pass from the system bus connector 199 to the system input/output connector(s) 200. The circuit line 201 is useful for monitoring the strength of the charge through the pulser diode 45, which provides a means for determining that the pulser is probably connected and operating properly and that the diode string in the pulser is functional. The various levels of detection accomplished by the pulser 15, and more specifically through its rows of slots provided within its encoder disc 42, provides signals upon the circuit lines 202, 203, and 204. The current conducted through these circuits corresponds to the current generated at the photo transistor 61 of the sensor housing 46. Thus, the light received by the photo transistor allows for the conduct of current through its various circuit lines, with the light emitted through the rows 53 through 55 of the encoder disc 42 generating charge within their associated circuit 202 through 204 respectively. And, the voltage at the circuit lines is in the vicinity of 10 volts dc, but as it passes through the level shifter 205 the potential is decreased to 5 volts dc, which is at that level of voltage at which the computer is designed to function. This level shifter is also obtained from Motorola Semiconductor Products. The frequency of current passing through the circuit 204 is then divided by means of a flip-flop 206, so that the quantity of fuel being dispensed at a high rate is more easily detectable by the row of slots 55. So that erroneous readings will not be obtained by way of the operations of the encoder disc of this pulser, a strobe signal is conducted through the circuit line 207, and pulses every 2 milliseconds of time, into the data latch means 208. This means is also obtained from Motorola. This effectively stores the data depicted at the various channels 53 through 55 of the encoder disc, as their transmitted light creates signals at the various corresponding photo transistors 61 housed by the sensor housing 46. The circuit line 208*a* is provided for furnishing means for remote authorization and remote price setting through the computer of this computer control pump. The signal upon this circuit line is also latched by means of the data latch 208, for the purpose of preventing any erroneous settings or readings of these components. Circuit line 209 is provided as a means for transmitting data to a remote readout unit, such a type of unit that may be located within the service building of the service station, so that the attendant can read particular data representative of the just completed sale, such as providing its termination as to the quantity of gas dispensed during the last sale, and the cost of the fuel delivered.

Also contained within this circuitry is the display heater control, or temperature sensor 210, which provides a signal to the circuit line 137, so that the heaters associated with the display assemblies can be conveniently turned on, or turned off, depending upon the current ambient temperature. This heater control is obtained from National Semiconductor Corporation. The temperature sensing device 211, being a thermistor, senses the ambient temperature, and then transmits an output signal at a particular voltage, usually 10 volts, over the circuit line 137 for comparison within the voltage comparators 130, as previously explained. The circuit line 212 provides a means for conducting a test of the heaters, even though the ambient temperatures may be above their operating levels, so that the service attendant can determine that the heaters are properly functioning, for that day when the temperatures will decrease below the level which initiates them into functioning.

The central processing unit of this invention is disclosed in FIG. 36, and includes the unit 213, as shown, and which may comprise a number 1802 microprocessor as marketed by RCA Corporation, Solid State Division, of Somerville, N.J. This microprocessor computes the algorithms shown in FIGS. 38, 39 and 40. This processor operates at a 2 megahertz clock frequency, through the operations of the clock pulser 214. This time base comprises a 2 megahertz quartz crystal which is obtained from M-Tron Corporation of Yankton, S. Dak. An interrupt timer 215 operates off of the clock 214, with the main purpose of said timer being to emit an interrupt signal by way of circuit line 216 to the interrupt input to the central processing unit 213, and secondly, to average a 120 hertz backplane signal by way of the circuit line 217 to the level shifters 218, where the voltage is increased from the computer operating 5 volt level to a 10 volt level useful for transmitting signals to the liquid crystal displays of the display assemblies 76. The level shifter 218 is of the type that is acquired on the market, and more specifically can be obtained from RCA Corporation, of New York, N.Y.

Also connecting with the central processing unit 213 is an AND gate 219, which receives signals from the central processing unit over its circuit lines SC0 and SC1, and which provide for a reset of the interrupt timer 215, at a time when the central processing unit is available to perform such. This timer is obtained from Motorola Semiconductor Corporation. In addition, the signal through the gate 219 is also conducted by way of the circuit line 220 and to the data latch 208, and through the strobe line 207 for pulsing of the data latch 208.

The currents generated through the operation of the sensor housing 46, and more specifically the current generated by the photo transistors at 61, are conducted through the slots provided in rows 53, 54 and 55, respectively, of the encoder disc 42. These currents are conducted to the central processing unit 213, wherein the computer then determines by way of accumulation the quantity and flow rates of the fuel being dispensed, in the manner as previously described when analyzing the operations of the encoder disc 42. The circuit line 208 provides for the conduct of current to the central processing unit, for authorizing the remote setting of price information and to authorize the remote readout of information relative to the quantity of fuel dispensed, and total price of fuel dispensed after a particular sale. The circuit line 209 provides a transmission of sales data from the central processing unit to a remote station for remote readout of such information. The signal from the central processing unit 213 along the circuit line 190 functions to provide operations for the crash timer 192, whose function within the circuitry of this invention was previously explained.

Also connecting with the central processing unit are the circuit lines 221 and 222, each, respectively, being connected to the output port and input ports 223 and 224, as shown. The ports are obtained from RCA Corporation. One provides an outputting of information when the program in the memory of this system instructs it to do so, while the input port transmits information back to the central processing unit, when certain conditions prevail, as will be subsequently explained. The information leading from the output port to the circuit line 221 and through the output port and latch 223 provides a readout of data and instructs the operations of the various liquid crystal displays, through the circuit lines 224*a*. Such occurs after the level shifters 218 has raised the voltage levels of these charges to at least 10 volts dc. An output strobe is generated by the output port and latch through the circuit line 225 and which when properly strobed provides a signal that validates the information being conducted to the display assemblies via the circuit lines 224. The clear circuit line 196 provides a signal to interlock 193 for the purposes as previously explained. In addition, circuit powers connected through the line 191 are providing the back plane clock operation for the crash timer 192, and also to provide a back plane signal for the liquid crystal displays receiving their separate current over the circuit lines 224.

The input port and latch 224 receives signals from remote sources, such as the pump handle input circuit line 197, which inputs data to the central processing unit that the pump has been turned on, or turned off, as detected by its switch 37. The pulser sale circuit line 201 to the input port and latch, likewise, conducts its signal by the central processing unit for further processing. A signal from the battery, as along the circuit line 226 indicates that the battery voltage has dropped below an acceptable operating level. This signal is also transmitted to the central processing unit, for processing. The ac power signal line 175 conducts a signal to the input port and latch, again for transmission to the central processing unit, in the event that the 10 volt regulator 162 has been shut off, in a manner as previously analyzed.

The totalizer clear circuit line 227 transmits a signal through the input port 224 for instructing the central processing unit to clear all totals that may be contained within the random memory 228.

Also connected to the input port, and latch, are the various keyboard switches associated with the keyboard 104, as previously analyzed and these switches are provided for injecting information into the central processing unit, in addition to the various RAM components of this computer. Such data as the setting of pricing, allocation limits for fuel dispensing, and that even the readout of totals as by the pressing of the keyboard button 108, which effectively drives a signal through the circuit line C3 and R4, can provide a readout of various accumulative data representative of the dispensing of fuel over a certain segment of period of time as previously explained.

The central processing unit 213 is connected by way of the circuit line 229 to the ROM address latch and decoder 230. This ROM decoder receives a strobe signal over the signal 229, and which latches the high order memory address from the central processing unit being conducted through the circuit line 231, wherein in the ROM address latch and decoder 230 then selects particular pages of the read only memory, ROM, so that these particular selected pages determine which portion of the stored program in the ROM memory 232, shall determine that particular operation of the computer. The ROM address latch and decoder 230 can be acquired from RCA Corporation, as can also be the ROM read only memory 232. This read-only memory 232 is preprogrammed to provide various steps for operation of the dispensing of fuel from the computer controlled pump of this invention, which program has been specified by the applicants herein, and is set forth in the appendix A of this application. The random access memory 228 is useful for storing totals relative to sales and for individual customer dispensing of the fuel. In addition, the RAM memory 228 as utilized by the central processing unit 213 is used in execution of subroutines and other computer control operations of this invention. This memory 233 can also be obtained from RCA Corporation, as can all other RAM components associated with this unit. The RAM address latch decoder 234 provides a decoding or determination as to when the random access memory 228 is to be selected for computing its function. The RAM lockout 235 interconnects between the central processing unit 213, and the RAM memory 233, and is used to deselect or turn off the RAM 233 particularly during a power outage situation, or power down situation, as when the dispenser is turned off for the night, or during power outage. And, while the power outage may prevail, this device 235 instructs RAM 233 to retain what information has been stored in it, and not to release it due to that power down condition.

Also disclosed within this FIG. 36 is the schematic of the battery 27, with this battery useful for providing power to the computer, with power being provided through the twenty-seven ohm resistor 236 to the circuit line 168, while the negative connection to the battery 27 is connected to ground through the circuit line 239. A current is conducted through the 180 ohm resistor 237, and functions to provide an indication that the battery is connected into the circuitry of the computer. The circuit line 177 connects with the battery 27 and through the two diodes 238, to provide power to the random access memory RAM 233, and the other RAM lock out means 235, during that period of time after live power has been shut off to the computer, such as that one hour segment of time thereafter when the operator may yet desire to obtain information from the computer regarding the dispenser's quantitative operations. This power is supplied from the battery to the memory 233 and RAM lock out 235 even beyond that one or other time period segment of time following the shut off of line power, so that information can remain stored within these components even when the dispenser has been shut off for a more permanent period of time. The interlock control connects by way of its circuit line 239 with the system power control 179, and the display power control 166, provide means for disabling power to the liquid crystal displays and any othecircuitry that is on. The primary function for the interlock is to provide means for immediately shutting off all power to the liquid crystal displays, and other remote circuitry of this invention, when the circuit board containing the components as displayed in FIG. 36 is disconnected from this computer controlled pump. The reason being that power to the displays can be disruptive and harmful to their further functioning, unless it is immediately shut off from operation. The circuit line 240 connects with the data bus 0 through 7 circuit line 241 leading from the central processing unit 213, and provides a means for determining whether the central processing unit is to process data and information that reads out totals in either gallons or liters of volume. This line includes a resistance 242 which has a tendency to pull the data bus to the logic 1, when the jumper 243 is in place, and provide a readout in gallons as the units of measurement for this dispenser. On the other hand, when the jumper 243 is cut, the computer has been programmed by way of the memory 232 to provide for a read out of the quantity of fuel being dispensed in liters.

The display latch and driver circuit board useful for principally conducting pulses to the display assemblies, for revealing information upon the display assembly 76, is set forth in FIG. 37. In this particular Figure, the backplane charge passing through the circuit line 191 is divided, by means of a series of flip-flops, as at 244, for reduction to one fourth of its frequency, or to 30 hertz. This frequency, and its accompanying line voltage, at 10 volts, is conducted over its circuit line 245 to the back of the liquid crystal display 82, as previously explained. The construction of these liquid crystal assemblies is well known in the art, and they can be obtained from Ladcor, Incorporated, Sunnyvale, Calif. At this frequency, the charge is conducted to the backplane of the liquid crystal display, and comprises the reference signal against which the signals conducted to the liquid crystal display determine which numeral is to be displayed at that particular instance.

The schematically drawn circuit line 246 is really four separate circuit lines, and which conducts current from the pin bus points PB3, 5, 7, 9, as along the circuit line 224*a*, as shown in FIG. 36, and this data is conducted by means of pulses representative of binary coded decimal information that determines what symbol or number is to be displayed upon the liquid crystal assembly 76. The signals conducted across the circuit line 247 is, once again, actually four separate circuit lines, representative of the pin bus points PB11, 13, 15, and 17, also being generated from the level shifters 218 of FIG. 36, and over the circuit lines 224*a*, as shown. These particular signals are delivered to a demultiplexer circuit 248, and this demultiplexer circuit takes the data provided on the circuit lines 247 and determines just where the data conducted over line 246 is to be stored, within the display latch and decoder driver circuit 249, the indicator and decimal point latch and driver 250, or the output latch 251. Thus, the multiplexer circuit 248 provides a determination as to just where the data transmitter of the circuit lines 246 are to be stored in preparation for transmission to the display assemblies for eventual display of the fuel dispensing information. This demultiplexer circuit 248 is of the type that may be obtained from Motorola Semiconductor Products of Tempe, Ariz. It is an integrated circuit that is marketed under its part No. 14514, by said Company.

The display latch and decoder circuit 249 takes the four bit binary coded decimal signals from the lines 246, stores such information, and then decodes the same into the seven segment data points for driving the corresponding segments of the LCD for displaying a number upon the display assemblies 76 and more specifically its liquid crystal means 82. That information is conducted over the circuit line 252, but actually this circuit line comprises a complete maze of circuit lines that lead towards the various segments of each number to be displayed upon the liquid crystal display. This display latch decoder driver circuit can also be obtained from the Motorola Semiconductor Products, of Tempe, Ariz., as product No. 14543.

The indicator and decimal point latch and driver 250 performs the function of storing information received from the data line 246 and which is useful for controlling the pump on indicator, by way of circuit line 253, with the pump on indicator being shown as the bars contained at 254 upon the display board panel 7 of FIG. 2. In addition, the low battery indicator is controlled by the indicator and decimal point latch and driver 250, by way of its circuit line 255, and this particular indicator is provided at 256 in FIG. 2. In addition, the attendant indicator 257, as in FIG. 2, is controlled by the driver 250, by way of its circuit line 258. The pump on indicator at 254 indicates when the pump has been turned on for dispensing of fuel, while the low battery indicator 256 indicates when the battery 27 or more specifically its potential has dropped below a particular level, as below 6 volts, since the battery typically operates at approximately 6.4 or 6.5 volts, while the attendant indicator 257 discloses a signal that some malfunctioning has been detected and is occurring in the dispenser.

The indicator 250 also provides a signal to the display assembly 76, and more specifically to its liquid crystal display 77, by way of the circuit line 259, for determining just where the decimal points should be located with respect to the numerical data displayed upon the same. This decimal point control is only used upon the gallon figure display, and particularly when the gallon display exceeds 100 gallons. This may occur at those service stations where trucks are serviced. In addition, this decimal point is also controlled when the quantity of fuel being dispensed is in liters and when the display of dispensed fuel is in liters, it is only displayed in one hundredths of a liter of volume of fuel.

The output latch 251 performs the function of taking the information off of the data circuit lines 246, stores the same therein, and outputs said information to the pump output, over the circuit line 260 which is conducted to the pump relay 141, instructing the same to switch on or off, as desired. In addition, the output latch 251 conducts a signal by way of its circuit line 262 to the high flow output of the dispenser, which signal is also conducted over the circuit line 135, as in FIG. 34, for providing a reference voltage in the voltage comparator of 130 for the purposes previously described. This output latch 251 can be obtained from Motorola Semiconductor Corporation, in Tempe, Ariz. as part No. 4042.

In the operation of this computer controlled dispenser, the initiation of its operations are commenced when the alternating current power is applied to the solid state computer at circuit lines 126 and 143, and with this occurrence the junction box power supply 125 turns on supplying 10 volts to the voltage comparator circuit 130, and 14 volts to the computer circuits located in the computer housing or card cage 11, over the circuit line 131 and 132. The 14 volts turn on the ten volt regulator 162, which supplies charge to the liquid crystal displays and the pulser, and voltage regulator 161, which supplies the central processing unit and control circuitry with electrical power, as shown in FIG. 36.

When the 5 volt regulator 161 turns on, the system power control 179 senses the high volts, and sends a signal to the automatic reset/start circuit 186, over the circuit line 185. The automatic reset run circuit then sends a clear signal to the central processing unit 213, over the circuit line 187. The clear signal resets the central processing unit 213, and causes it to begin performing the initialization program located in the read only memory 232.

The initialization program sets up the internal machine status of the central processing unit, determines if the quantity is to be displayed in English or metric units, and tests the price and totals data which was stored in the random access memory RAM 233. If no price has been previously entered into the RAM 233, or if the data was lost due to a failure of the battery 27, then a new price must be entered from the keyboard 104. This is done by pressing the asterisk button 107, and then entering the price upon the units buttons located upon the same keyboard.

Upon completion of the initialization program, the pump is ready for use. At this time the central processing unit 123 is waiting for the pump handle input, or an input from the keyboard. When the pump handle is turned on, the central processing unit senses the closure of this pump switch 37 over circuit line 197 through the input port and latch 224. Next, the central processing unit tests the ROM 232, checking all of the data stored in the said ROM to investigate for its accuracy, and it also tests the ac power on line 175 and checks the pulser diode string or pulser failure circuit line 201. If all of these check out adequately, then the central processing unit 213 turns on the pump relay 141, and the high flow valve by turning on its solid state switch 138, which is accomplished by a turn on by the output latch 251. The pump motor is now on and ready for operation.

The central processing unit also turns on the pump-on indicator 254, which is located within the sale display space 101, and clears the sale and quantity displays, also at 101, to zero.

Next the central processing unit monitors the pulser channels A, B, and C, or 53, 54, and 55, respectively, by reading circuit lines 202, 203, and 204. Signals are sampled every 2 milliseconds at the beginning of the interrupt subroutine. During the interrupt subroutine, the central processing unit determine if any product has been dispensed. If so, it determines which direction product flows, and how much product has been dispensed. The central processing unit then takes the results and updates the quantity display and price display accordingly. This is accomplished by readouts through the display latch 249 and the indicator and decimal point latch 250. The central processing unit analyzes the three pulser channels always to determine that all three are changing and are properly functioning. If not, then the central processing unit turns the pump relay off, and also the high flow valve and pump on indicators off, and outputs a malfunction to the indicator 257 of the price display, to indicate a malfunction has or is occurring.

When the sale is completed, the central processing unit 213 senses that the pump handle has been turned off, and turns off the pump relay, the high flow valve, and the pump on indicator. Then the central processing unit transfers the data contained in the sale and quantity displays, and adds this data to the totals of data stored in the RAM memory 233. Now the central processing unit waits for another pump handle input or keyboard input.

When the alternating current power is turned off, the central processing unit begins timing the length of time power is off, but the battery 27 continues to deliver power to the circuits. If after one hour, the alternating current power is not restored, the central processing unit turns off the system power control 179, which terminates power to all of the circuitry except the RAM 233. This is done to conserve the energy stored in the battery, while yet maintaining totals and price information.

Figure 38:
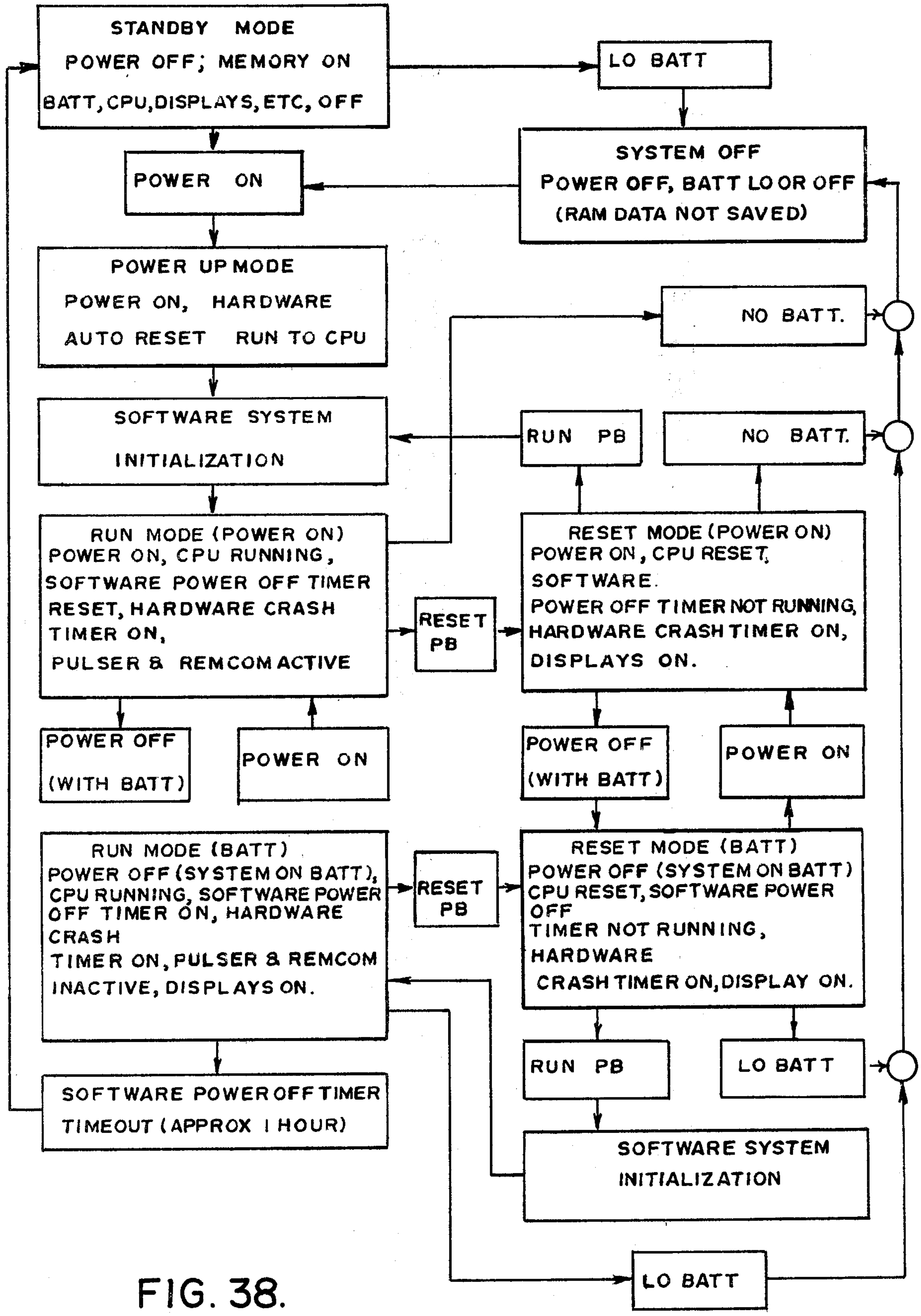
FIG. 38 provides a system state diagram and display information for the program of this invention.

In referring to FIG. 38, there is disclosed a systems state diagram for the program of this invention. More specifically, this state diagram shows the various states of the system and their relationship to each other within the controller for fuel dispenser. The items that affect these states are the state of the system power, and as can be seen, the various power on/off push buttons, operated either from the standard electrical charge, or from a battery, in addition to the various standby modes for system on, system off, etc., are disclosed, and their relationship to each other within the device. The state of the battery power, its insertion into the system, or determination as to whether or not the battery is on, off, or whether a low battery is experienced, is also gauged from this system. The automatic reset-run function, as when the operation runs normally, under the run mode, or when it must be reset for a subsequent cash sale, or for a determination of the totals, as at the end of a business day, is included within the system of this device. A manual reset means is included in the system, as are various hardware and software timers, are included during the various modes of operation of this invention.

Figure 39:
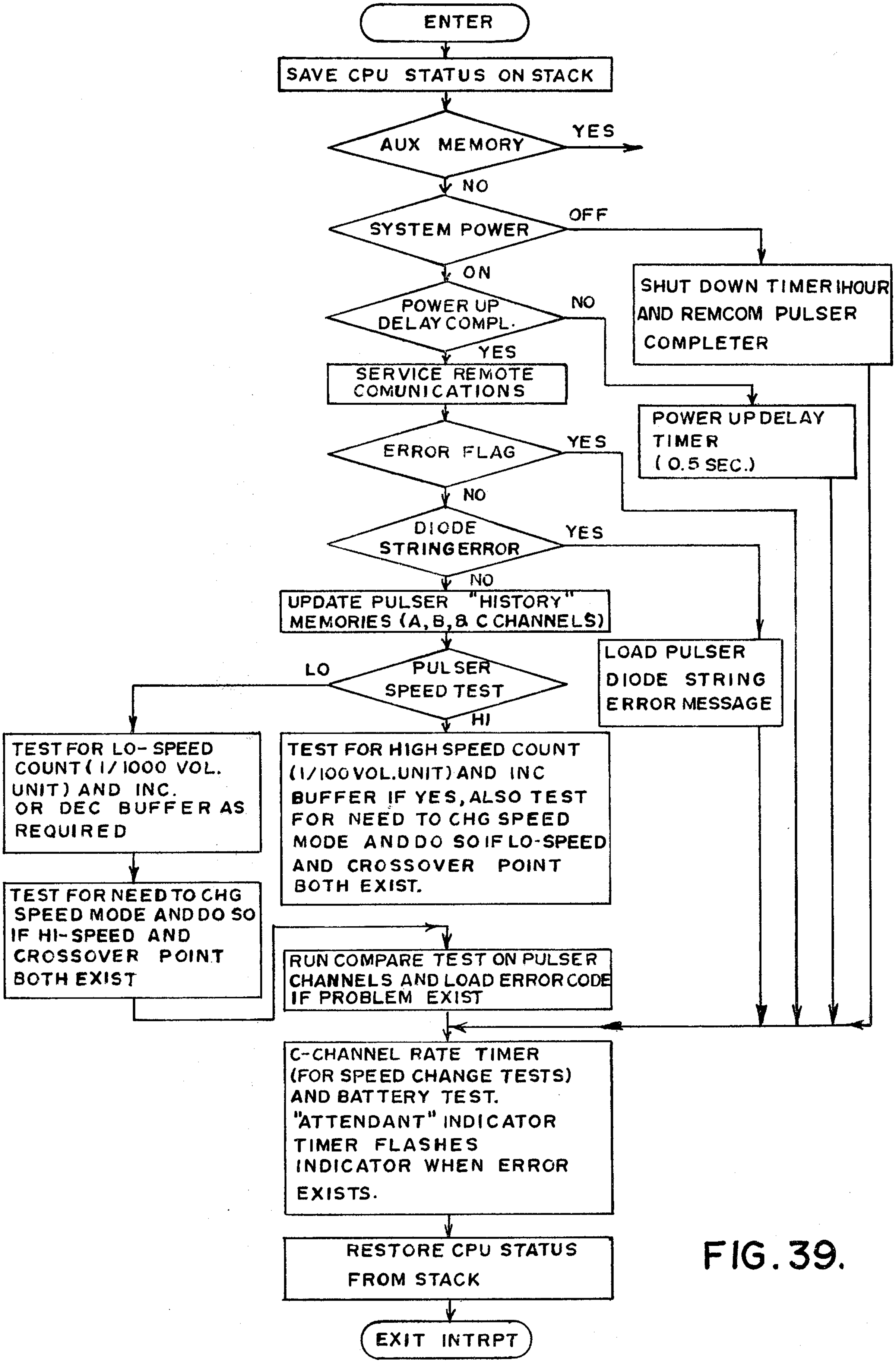
FIG. 39 provides a display of the interrupt routine of the pump program for this invention.

FIG. 39 provides a flow chart of the interrupt routine of the pump program for this invention. The interrupt routine is called by the clock hardware every two milliseconds to input flow data from the pulser, such as the pulser assembly 15 as previously described herein, and to test the pulser, communicate with the remote readout and/or control device via the serial input/output and to increment various software timers. As can be seen, the various channels of slots contained upon the pulser disc provide an input of data in conjunction with the timer for determining both the quantity of fuel flow, and whether it is being delivered, or perhaps retracted, in the manner as previously described in this application.

Figure 40:
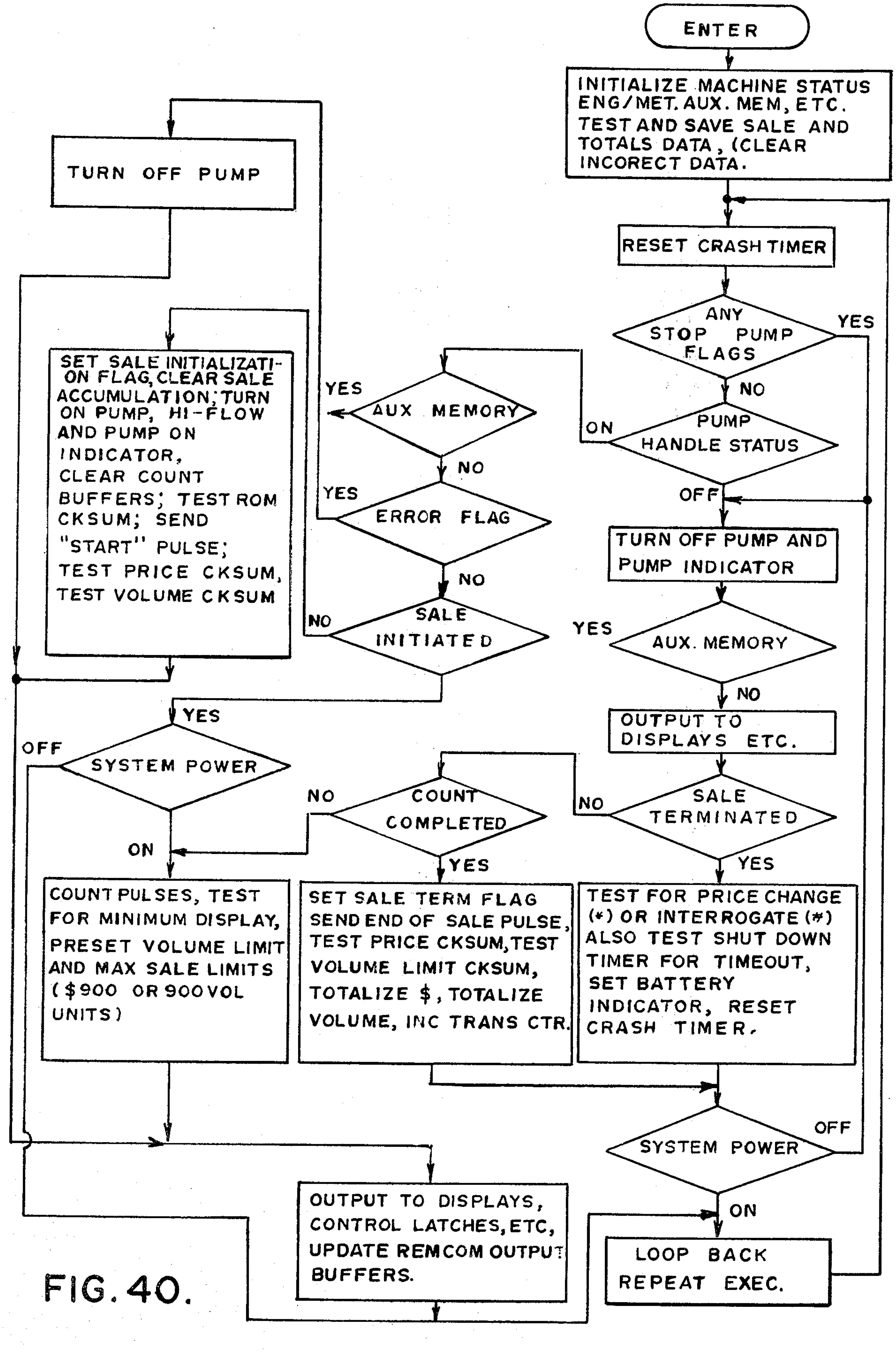
FIG. 40 provides a schematic display of the initialization and executive routines for the dispenser program of this invention.

FIG. 40 provides a flow chart showing the system initialization and executive routines and which give an overview of the system operation. The initialization routine sets up the central processing unit for this invention, initializes the RAM including the test and recovery of the data portions of the RAM, and then passes control to the executive routine. The executive routine controls the operation of the system to cause it to carry out the tasks required to properly measure and control the flow of fuel from the dispenser. The foregoing figures, as described, provide for a proper understanding of the hardware, the software, and the interaction between the two to measure and control the flow of fuel from this dispenser.

Variations in the construction, assembly, and circuit patterns for this computer controller for fuel dispenser may occur to those skilled in the art upon reviewing the subject matter of this invention. Any such variation or modifications, if within the spirit of this invention, are intended to be encompassed within the scope of any claims to patent protection issuing hereon. The description of the preferred embodiment set forth herein is done so for illustrative purposes only.

Having thus described the invention, what is claimed and desired to be secured by Letters Patent is:

1. A controller for fuel dispenser for use in facilitating and accurately determining the quantity of fuel being dispensed, comprising, a base member, a pulser means supported by said base member, computer means operatively associated with the said pulser means and responsive to signals generated by the pulser means for processing data relative to the dispensing of fuel, said pulser means including an encoder disc mounted for revolving in two directions in response to the flow of fuel being dispensed or monentarily drawn within the dispenser, said disc including rows of detecting means for providing sensing of the quantity and direction of flow of the fuel being dispensed, said rows of detecting means including a series of rows of slots formed through the said encoder disc and useful for effecting sensing of the rates of flow of fuel being dispensed and the direction of fuel flow, said pulser means including sensor means responsive to the turning of the disc and generating electrical signals in response thereto and transferring said signals to the computer means for processing, wherein one row of the slots of the encoder disc cooperating with the sensor means for signaling a detection of the rate of quantity of fuel being dispensed to a first limit, and another row of slots of the encoder disc cooperating with the sensor means and provided for signaling and detecting the rates of flow of fuel in excess of the said first limit, and another row of slots of the encoder disc provided for determining the discharging and retracting of dispensing and flowing fuel, and display means operatively associated with the said computer means for displaying the processed data.

2. The invention of claim 1 and wherein said detected direction of fuel flow functioning only in response to rates of fuel flow up to the said first limit.

3. The invention of claim 2 and wherein said sensor means including at least one light emitting diode and accompanying photo transistor for receiving light passing through the slotted encoder disc and for generating electrical signals in response thereto, said generated signals provided for determining the quantity of fuel being dispensed, and for determining the discharging and retracting of dispensing fuel.

4. The invention of claim 3 and wherein said means comprising another row of slots provided through said encoder disc and cooperating with the sensor means for detecting the direction of rotation of said disc, whereby disc rotation in one direction represents a dispensing of fuel, and disc rotation in the opposite direction indicating a reversal of dispensing fuel flow.

5. The invention of claim 4 and including junction box means mounted upon the said base member of the controller for fuel dispenser and useful for shielding those wires conducting that electrical charge capable of igniting fuel vapors upon sparking or thermal overstress.

6. The invention of claim 5 and wherein said junction box means being formed as an explosion proof box.

7. The invention of claim 6 and including pipe barrier means connecting with said junction box and useful for holding the wire extending through the said box for precluding explosion at said location.

8. The invention of claim 7 and including a wiring packing provided within the pipe barrier means and useful for segregating the wiring extending into and from the said junction box.

9. The invention of claim 8 and including sealing means provided to the sides of the said packing and surrounding the wiring to seal the same within the said pipe barrier means.

10. The invention of claim 9 and wherein said sealing means comprises an epoxy.

11. The invention of claim 3 and including a sensor housing, and said sensor means embodied within said sensor housing.

12. The invention of claim 11 and wherein said sensor housing having a gap provided therethrough, the encoder disc disposed for revolving through said sensor housing gap, said disc incorporating means operatively associated sensor means for detecting the rates of quantity dispensing of fuel.

13. The invention of claim 12 and wherein said sensor housing mounts upon the base member, and said housing being adjustable with respect to said base and encoder disc for regulating the fine operations of the said sensors.

14. The invention of claim 13 and wherein said sensor housing including a pair of flanges extending to either of its sides, fastener means cooperating with said flanges for securing said housing to the base member.

15. The invention of claim 14 and including means for facilitating the adjustment of the said sensor housing, said means including an apertured tab extending from at least one of the front and rear side of the said housing, a pin projecting from the base member and extending into the apertured tab, whereby upon a shifting of the housing about its supporting pin an adjustment in its setting with respect to the revolvable encoder disc is effected.

16. The invention of claim 3 and including mechanical recording means responsive to the rotation of the encoder disc and useful for providing a supplemental recording of the quantity of fuel being dispensed by the computer controlled fuel dispenser.

17. The invention of claim 3 and including a computer housing for the said fuel dispenser, said housing mounted upon one of the said base member and junction box, and said display means operatively associated with the said computer housing for disclosing information relative to fuel dispensing.

18. The invention of claim 17 and including a series of display assemblies mounting upon each display means, and each display assembly incorporating at least one liquid crystal display for disclosing information relative to fuel dispensing.

19. The invention of claim 18 and wherein each display assembly includes a glass assembly incorporating the liquid crystal display, a circuit board for inputting of electric signals representative of data to the said display assembly, a polarizer provided upon the exposed surface of the glass assembly, a reflector provided contiguously upon the bottom surface of the said glass assembly, and conductors supporting the said glass assembly spacedly off of the circuit board and useful for conducting select charges to the said liquid crystal display.

20. The invention of claim 19 and including heating means provided proximate the glass assembly of the liquid crystal display and useful for warming the display during predetermined temperature conditions to assure the proper operations of each liquid crystal display.

21. The invention of claim 20, and including bezel means mounting upon the said circuit board and useful for positioning and mounting of the liquid crystal display of the display assembly.

22. The invention of claim 21 and wherein there are a pair of display means mounted upon opposite sides of the computer housing.

23. The invention of claim 21 and wherein there are a pair of display means, said display means being portable and each capable of being suspended upon the fuel dispenser.

24. The invention of claim 23 and wherein each portable display means includes an enclosure, said enclosure having a series of openings therethrough and for mounting of the display assemblies for viewing within each opening, said enclosure having an integral rim extending around its periphery, and clamp means provided upon said enclosure for securing it with the dispenser.

25. The invention of claim 24 and wherein said clamp means including a rod extending across the enclosure, and at least one clip securing on the rod and also securing onto the said dispenser.

26. The invention of claim 19 and wherein said computer means including a central processing unit, a ROM address and latch and decoder, a read only memory, a RAM address and latch decoder, and a random access memory, all electrically connected together and selectively preprogrammed to process signals received from the pulser means, and said processed signals being transmitted to the said display assembly for disclosure upon the accompanying liquid crystal display of information relative the fuel being dispensed.

27. The invention of claim 26 and including a demultiplexer circuit means electrically connected with the said central processing unit and capable of receiving certain of the processed signals therefrom, and a display latch and decoder driver circuit electrically connecting with both the said demultiplexer circuit and the central processing unit for reception of processed signals from both of said means and for temporary storage of said signals therein incident to their transmission to the display assemblies for disclosure of information relating to fuel dispensing upon their liquid crystal displays.

28. The invention of claim 26 and including jumper wire means connecting with the central processing unit, and when disconnected, providing for a readout of information in the metric system of units.

29. The invention of claim 3 and wherein said controller for fuel dispenser and its associated pulser means and computer means being energized for operation from an electrical source, said electrical source including a battery capable of energizing said means on a reserve basis, said base member including upstanding integral braces, and said braces supporting said battery upon the base member.

30. The invention of claim 29 and wherein said display means through computations performed by the computer means capable of disclosing information relative to the quantity and value of fuel dispensed per transaction.

31. The invention of claim 30 and including said display means disclosing the cost per unit volume of fuel dispensed.

32. The invention of claim 31 and including a keyboard means electrically connecting with the said computer means and for use in the inputting of data into the fuel dispenser particularly relating to the price per unit volume of fuel dispensed.

33. The invention of claim 32 and wherein said keyboard means upon actuation capable of initiating the sequential signaling of data for display upon the display assembly relating to the total volume of fuel dispensed, the total value of fuel dispensed, and the number of transactions involved, for that period of time intervening from the last readout of such information from the computer means.

34. The invention of claim 33 and including magnetically actuatable means mounting upon the dispenser, magnetic wand means capable of remotely triggering said magnetically actuatable means, said magnetically actuatable means electrically connecting with the said keyboard means whereby upon positioning of the said wand means proximate the said magnetically actuated means a remote readout of the aforesaid type of information relative to fuel dispensing per increment of time can be obtained.

35. The invention of claim 32 and wherein the operations of said keyboard means for the inputting of price changes into the said dispenser prevents the dispensing of fuel from the same during said operation.

36. The invention of claim 30 and wherein said display means incorporating signaling means, and said signaling means capable of disclosing information relative to the fuel dispenser being turned on, the existence of a weak battery, and a malfunctioning in the computer controlled fuel dispenser operations.

37. The invention of claim 30 and including a power supply for the computer controlled fuel dispenser, and said power supply when operating capable of reducing line voltage to approximately not in excess of 14 volts rms.

38. The invention of claim 37 and including a voltage comparator, said voltage comparator electrically connecting with said power supply and receiving a reference voltage therefrom, a high flow signal circuit line connecting with the voltage comparator and capable of signaling from the computer means to said comparator a voltage for comparison with the reference voltage and for determining when said pulser means shall detect fuel dispensing above the first limit, and switch means electrically connecting with said voltage comparator and being actuated for initiating said procedure.

39. The invention of claim 37 and including a voltage comparator, said voltage comparator electrically connecting with the power supply and receiving a reference voltage therefrom, a pump relay connecting with the voltage comparator and when turned on initiating the energization of the fuel dispenser and its availability for dispensing of fuel.

40. The invention of claims 20 or 37 and including a voltage comparator, said voltage comparator electrically connecting with the power supply and receiving a reference voltage therefrom, temperature responsive means electrically connecting with said voltage comparator and capable of signaling from the computer means to said comparator a voltage for comparison with the reference voltage and for determining when the display assembly heater shall be actuated, and switch means electrically connecting with the said voltage comparator and being actuated for initiating the turn on of the said heater when a disparity in the voltage levels between the heater circuit line delivered voltage and the reference voltage is detected.

41. The invention of claim 29 and wherein said computer is designed intrinsically safe for operating and being energized by voltages less than 10 volts.

42. The invention of claim 19 and wherein said reflector comprises an electro luminescent panel and which effectively absorbs light thereby providing for clear display of the illuminated numerals upon the liquid crystal display.

* * * * *